US008619323B2

(12) United States Patent
Goto et al.

(10) Patent No.: US 8,619,323 B2
(45) Date of Patent: Dec. 31, 2013

(54) IMAGE PROCESSING APPARATUS AND IMAGE PROCESSING METHOD FOR PROCESSING MULTIVALUED IMAGE DATA AND RECORDING AN IMAGE IN A PIXEL AREA ON RECORDING MEDIUM BY A PLURALITY OF RELATIVE SCANS OF RECORDING HEAD AND RECORDING MEDIUM

(75) Inventors: Fumihiro Goto, Kawasaki (JP); Akitoshi Yamada, Yokohama (JP); Mitsuhiro Ono, Tokyo (JP); Rie Kajihara, Minoo (JP); Fumitaka Goto, Tokyo (JP); Okinori Tsuchiya, Yokohama (JP); Ayumi Sano, Kawasaki (JP); Tomokazu Ishikawa, Kawasaki (JP); Takashi Fujita, Kawasaki (JP); Shigeyasu Nagoshi, Yokohama (JP); Akihiko Nakatani, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 476 days.

(21) Appl. No.: 12/954,459

(22) Filed: Nov. 24, 2010

(65) Prior Publication Data
US 2011/0128561 A1 Jun. 2, 2011

(30) Foreign Application Priority Data
Dec. 2, 2009 (JP) .................... 2009-274958

(51) Int. Cl.
*G06F 3/12* (2006.01)
*G06F 15/00* (2006.01)
*H04N 1/40* (2006.01)
*H04N 1/04* (2006.01)
*H04N 1/46* (2006.01)
*G06K 9/34* (2006.01)
*G06K 9/46* (2006.01)
*G06K 9/68* (2006.01)

(52) U.S. Cl.
USPC ........... 358/1.9; 358/1.15; 358/448; 358/474; 358/501; 382/173; 382/193; 382/194; 382/221

(58) Field of Classification Search
USPC ............... 358/1.9, 1.12, 3.03, 1.14, 501, 448, 358/502, 526, 530, 538, 456, 453, 445, 358/3.04, 3.05, 3.23, 3.26, 3.2, 3.1, 3.06, 358/2.1, 534, 535, 536, 474, 494, 496, 497; 382/173, 237, 254, 252, 279, 282, 283, 382/194, 193, 221, 299; 347/37, 19, 9, 41, 347/43, 15, 57, 10, 56, 65, 183
See application file for complete search history.

(56) References Cited

U.S. PATENT DOCUMENTS 6,511,143 B1 1/2003 Ishikawa et al.
7,130,083 B1 10/2006 Konno et al.
(Continued)

FOREIGN PATENT DOCUMENTS

JP 2000-103088 A 4/2000
JP 2001-054956 A 2/2001

*Primary Examiner* — Ngon Nguyen
(74) *Attorney, Agent, or Firm* — Canon USA Inc. IP Division

(57) ABSTRACT

When the number (M) of passes is smaller than a threshold value, a first processing mode is selected. In the first processing mode, multivalued image data is divided into pieces of multivalued data corresponding to passes and a common multivalued data for a plurality of passes, the pieces of multivalued data are individually binarized to generate pieces of binary data corresponding to the passes, and the common multivalued data is binarized to generate common binary data for these passes. On the other hand, when the number (M) of passes is equal to or larger than the threshold value, a second processing mode is selected. In the second processing mode, multivalued image data is binarized and the binary data is divided into pieces of binary data corresponding to passes with a mask.

7 Claims, 16 Drawing Sheets

(56) References Cited

U.S. PATENT DOCUMENTS

| | | | |
|---|---|---|---|
| 2008/0130024 A1* | 6/2008 | Kakutani | 358/1.9 |
| 2008/0137146 A1* | 6/2008 | Marumoto | 358/3.03 |
| 2009/0161131 A1* | 6/2009 | Fujimoto et al. | 358/1.9 |
| 2009/0244572 A1* | 10/2009 | Hansaki et al. | 358/1.9 |

* cited by examiner

MAIN SCANNING DIRECTION

FIG. 7A

|   | ● | 7 |
|---|---|---|
| 1 | 3 | 5 |

● TARGET PIXEL

FIG. 7B

|   | ● | 9 | 3 |
|---|---|---|---|
| 5 | 9 | 3 |   |
|   | 3 |   |   |

● TARGET PIXEL

FIG. 7C

|   |   | ● | 2 | 1 |
|---|---|---|---|---|
| 1 | 1 | 2 | 1 |   |

● TARGET PIXEL

FIG. 13A

| TYPE OF RECORDING MEDIUM | IMAGE QUALITY | THE NUMBER OF PASSES |
|---|---|---|
| NORMAL SHEET | HIGH SPEED | 2 |
| | HIGH QUALITY | 4 |
| GLOSSY SHEET | HIGH SPEED | 2 |
| | HIGH QUALITY | 8 |

FIG. 13B

| TYPE OF RECORDING MEDIUM | IMAGE QUALITY | THE NUMBER OF PASSES |
|---|---|---|
| NORMAL SHEET | HIGH SPEED | 1 |
| | STANDARD | 2 |
| | HIGH QUALITY | 4 |
| GLOSSY SHEET | HIGH SPEED | - |
| | STANDARD | 3 |
| | HIGH QUALITY | 8 |

IMAGE PROCESSING APPARATUS AND IMAGE PROCESSING METHOD FOR PROCESSING MULTIVALUED IMAGE DATA AND RECORDING AN IMAGE IN A PIXEL AREA ON RECORDING MEDIUM BY A PLURALITY OF RELATIVE SCANS OF RECORDING HEAD AND RECORDING MEDIUM

BACKGROUND OF THE INVENTION

1. Field of the Invention

The present invention relates to an image processing apparatus and an image processing method for processing multivalued image data for an area (for example, a pixel area) on a recording medium to record an image in the area by a plurality of relative movements between the recording medium and a recording head.

2. Description of the Related Art

As a technique for reducing color density unevenness and streaks in images recorded by inkjet recording apparatuses, a multipass recording method is known of completing an image to be recorded in an area on a recording medium by causing a recording head to perform recording scanning a plurality of times in the area. However, even if such a multipass recording method is employed, the last recording scanning and the next recording scanning may not be performed at the same dot recording position owing to the change in a conveyance distance of a recording medium. This causes the change in a dot coverage ratio, so that image degradation such as the change in the color density or the color density unevenness occurs.

As a technique for reducing such image degradation, Japanese Patent Laid-Open No. 2000-103088 discloses a method of dividing multivalued image data into pieces of multivalued image data for different recording scans and separately binarizing these pieces of multivalued image data. FIG. 16A is a diagram illustrating the arrangement of dots recorded on the basis of image data processed with the method disclosed in Japanese Patent Laid-Open No. 2000-103088. Referring to FIG. 16A, black circles 551 represent dots recorded in a first recording scan, white circles 552 represent dots recorded in a second recording scan, and gray circles 553 represent dots each generated by overlapping a dot recorded in the first recording scan and a dot recorded in the second recording scan.

Even if the group of dots recorded in the first recording scan and the group of dots recorded in the second recording scan are shifted in a main scanning direction or a subscanning direction, a dot coverage ratio with respect to a recording medium is not significantly changed. The reason for this is that a portion in which a dot recorded in the first recording scan and a dot recorded in the second recording scan overlap each other is newly generated and a portion in which a dot recorded in the first recording scan and a dot recorded in the second recording scan should overlap each other is eliminated.

In the method disclosed in Japanese Patent Laid-Open No. 2000-103088, however, since pieces of multivalued data corresponding to different recording scans are separately quantized, it is impossible to control the amount of overlapping of dots recorded in different recording scans. Accordingly, the number of overlapping dots may be markedly increased, and the graininess of an image may be deteriorated. In contrast, the number of overlapping dots may become too small to suppress the change in color density.

Furthermore, in the method disclosed in Japanese Patent Laid-Open No. 2000-103088, the number of times of division of multivalued data increases with the number of passes. That is, the number of pieces of multivalued data to be subjected to quantization increases. Accordingly, when this method is performed in a recording mode in which the number of passes is large, the load of quantization is markedly increased.

When the number of passes is large, the amount of conveyance of a recording medium performed between passes is relatively small. Accordingly, the amount of change in a dot coverage ratio which is caused by the change in a conveyance distance of the recording medium is small. It is therefore unnecessary to perform processing for generating a portion in which dots overlap each other so as to suppress the change in a dot coverage ratio. When the number of passes is large, it is desirable that processing for reducing graininess and the load of quantization be performed.

SUMMARY OF THE INVENTION

The present invention provides an image processing apparatus and an image processing method capable of suppressing the change in color density and reducing graininess and the load of data processing by appropriately performing data processing in accordance with the number of passes.

An image processing apparatus according to an embodiment of the present invention processes multivalued image data corresponding to an image to be recorded in a pixel area on a recording medium to record the image in the pixel area on the recording medium by a plurality of relative scans of a recording head and the recording medium. The image processing apparatus includes an acquisition unit configured to acquire information about the number of the relative scans performed on the pixel area, a selection unit configured to select a first processing mode when a relative scan number represented by the information acquired by the acquisition unit is smaller than a threshold value and to select a second processing mode when the relative scan number is equal to or larger than the threshold value, and a processing unit configured to perform the first processing mode or the second processing mode selected by the selection unit. The first processing mode is a mode in which image processing including first dividing processing, first quantization processing, and synthesis processing is performed. The first dividing processing is processing for dividing the multivalued image data into pieces of multivalued data corresponding to the plurality of relative scans and common multivalued data corresponding to at least two of the plurality of relative scans. The first quantization processing is processing for individually quantizing the pieces of multivalued data obtained by the first dividing processing to generate pieces of quantization data corresponding to the plurality of relative scans and quantizing the common multivalued data obtained by the first dividing processing to generate common quantization data corresponding to the two of the plurality of relative scans. The synthesis processing is processing for performing synthesis with the pieces of quantization data and the common quantization data generated by the first quantization processing to generate pieces of synthesis quantization data corresponding to the plurality of relative scans. The second processing mode is a mode in which image processing including second quantization processing and second dividing processing is performed. The second quantization processing is processing for quantizing the multivalued image data to generate quantization data. The second dividing processing is processing for dividing the quantization data generated by the second quantization processing into pieces of divided quantization data corresponding to the plurality of relative scans.

An image processing apparatus according to an embodiment of the present invention processes multivalued image data corresponding to an image to be recorded in a pixel area on a recording medium to record the image in the pixel area on the recording medium by a plurality of relative scans of a recording head and the recording medium. The image processing apparatus includes an acquisition unit configured to acquire information about the number of the relative scans performed on the pixel area, a selection unit configured to, when a relative scan number represented by the information acquired by the acquisition unit is smaller than a threshold value, select a first processing mode in which the multivalued image data is divided into pieces of multivalued data corresponding to the plurality of relative scans and then the pieces of multivalued data are quantized and to, when the relative scan number is equal to or larger than the threshold value, select a second processing mode in which the multivalued image data is quantized for generation of quantization data and then the quantization data is divided into pieces of divided quantization data corresponding to the plurality of relative scans, and a processing unit configured to perform the first processing mode or the second processing mode selected by the selection unit. The first processing mode includes at least one mode in which image processing including dividing processing, quantization processing, and synthesis processing is performed. The dividing processing is processing for dividing the multivalued image data into multivalued data corresponding to a first relative scan, multivalued data corresponding to a second relative scan, and multivalued data corresponding to the first and second relative scans. The quantization processing is processing for individually quantizing the pieces of multivalued data obtained by the dividing processing to generate first quantization data, second quantization data, and third quantization data. The synthesis processing is processing for synthesizing the first quantization data and the third quantization data to generate synthesis quantization data corresponding to the first relative scan and synthesizing the second quantization data and the third quantization data to generate synthesis quantization data corresponding to the second relative scan.

An image processing method according to an embodiment of the present invention is a method of processing multivalued image data corresponding to an image to be recorded in a pixel area on a recording medium to record the image in the pixel area on the recording medium by a plurality of relative scans of a recording head and the recording medium. The image processing method includes acquiring information about the number of the relative scans performed on the pixel area, selecting a first processing mode when a relative scan number represented by the acquired information is smaller than a threshold value and selecting a second processing mode when the relative scan number is equal to or larger than the threshold value, and performing the selected first processing mode or the selected second processing mode. The first processing mode is a mode in which image processing including first dividing processing, first quantization processing, and synthesis processing is performed. The first dividing processing is processing for dividing the multivalued image data into pieces of multivalued data corresponding to the plurality of relative scans and common multivalued data corresponding to at least two of the plurality of relative scans. The first quantization processing is processing for individually quantizing the pieces of multivalued data obtained by the first dividing processing to generate pieces of quantization data corresponding to the plurality of relative scans and quantizing the common multivalued data obtained by the first dividing processing to generate common quantization data corresponding to the two of the plurality of relative scans. The synthesis processing is processing for performing synthesis with the pieces of quantization data and the common quantization data generated by the first quantization processing to generate pieces of synthesis quantization data corresponding to the plurality of relative scans. The second processing mode is a mode in which image processing including second quantization processing and second dividing processing is performed. The second quantization processing is processing for quantizing the multivalued image data to generate quantization data. The second dividing processing is processing for dividing the quantization data generated by the second quantization processing into pieces of divided quantization data corresponding to the plurality of relative scans.

According to an embodiment of the present invention, data processing is appropriately performed in accordance with the number of scans (that is, the number of passes) performed on a pixel area by a recording head. As a result, it is possible to suppress the change in color density caused by the change in a dot coverage ratio, graininess, and the load of data processing.

Further features of the present invention will become apparent from the following description of exemplary embodiments with reference to the attached drawings.

BRIEF DESCRIPTION OF THE DRAWINGS

FIGS. 7A to 7C are diagrams illustrating error distribution matrices representing error distribution coefficients for surrounding pixels used in error diffusion processing.

FIGS. 13A and 13B are tables that are used in first to fourth embodiments and indicate the relationship among the type of a recording medium, print quality, and the number of recording passes.

DESCRIPTION OF THE EMBODIMENTS

An inkjet recording apparatus according to an embodiment of the present invention will be described below. However, the present invention is not limited to an inkjet recording apparatus. Another apparatus using a method of recording an image on a recording medium with a recording head for recording a dot during a relative scan between the recording head and the recording medium may be used.

In this specification, "multipass recording" indicates a recording method of completing an image to be recorded in a recording area on a recording medium by a relative scan (relative movement) between a recording head and the recording medium. The "relative scan (relative movement) between a recording head and a recording medium" indicates an operation (scanning) for moving the recording head relative to the recording medium or an operation for moving (conveying) the recording medium relative to the recording head. The "recording area" microscopically indicates a single "pixel area" and macroscopically indicates an "area in which recording can be completed by a single relative scan." The "pixel area (also merely referred to as a "pixel")" refers to a minimum unit area whose grayscale level can be represented with multivalued image data. The "area in which recording can be completed by a single relative scan" indicates an area on a recording medium through which a recording head passes during a single relative scan or an area smaller than such an area (for example, a single raster area.) For example, when a recording apparatus of a serial type performs an M-pass (M is an integer equal to or greater than two) multipass mode illustrated in FIG. 2, a single recording area illustrated in FIG. 2 (an area with a width 1/M times a nozzle arrangement width) may be macroscopically defined as the above-described "recording area."

In the following description, the "relative scan" is merely referred to as a "scan." For example, in 3-pass multipass recording, a relative scan is performed three times (a first relative scan, a second relative scan, and a third relative scan) on a single pixel area. In this case, the first relative scan, the second relative scan, and the third relative scan are referred to as a "first scan", a "second scan", and a "third scan", respectively.

Schematic Configuration of Recording Apparatus

Figure 1A:
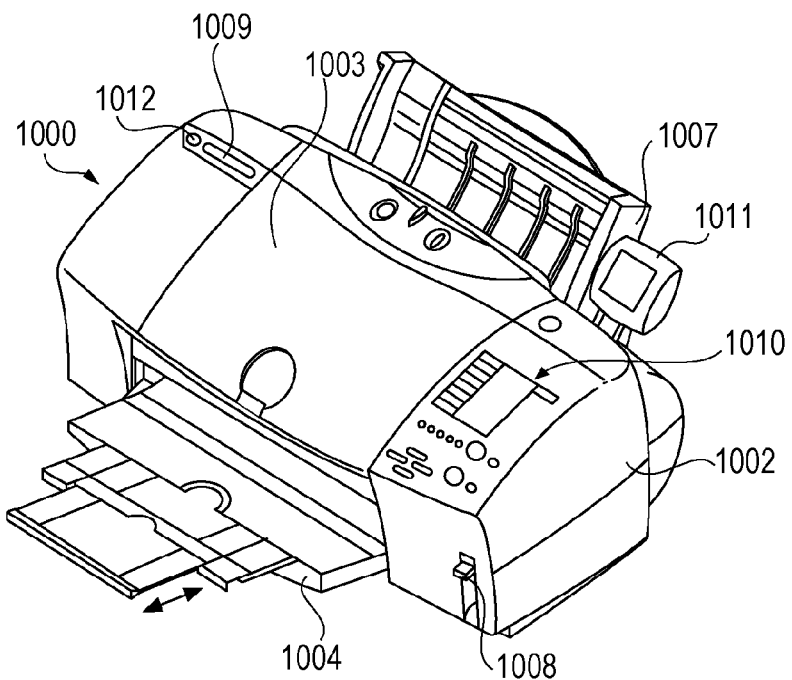
FIGS. 1A to 1C are schematic diagrams illustrating a configuration of a printer functioning as an image processing apparatus according to an embodiment of the present invention.

FIG. 1A is a schematic perspective view of a photo-direct printer apparatus (hereinafter referred to as a PD printer) 1000 that is applicable as an image processing apparatus according to an embodiment of the present invention. The PD printer 1000 has a function of receiving data from a host computer (PC) and performing printing with the data, a function of directly reading image data stored in a storage medium such as a memory card and performing printing with the image data, and a function of receiving image data from a digital camera or a PDA and performing printing with the image data.

Referring to FIG. 1A, a discharge tray 1004 on which recorded sheets can be stacked and an access cover 1003 that can be opened/closed by a user who wants to exchange a recording head cartridge, an ink tank, or the like contained in a main body are illustrated. Menu items for various settings of print conditions (for example, the type of a recording medium, print quality, etc.) are displayed on an operation panel 1010 disposed in an upper case 1002. A user can set the menu items in accordance with the type and application of an image to be output. In this embodiment, the number of passes (the number of times of scanning of a recording head performed on a pixel area) in a recording mode is determined in accordance with the combination of the type of a recording medium and print quality. The menu items displayed on the operation panel 1010 include an item allowing a user to input an image output instruction. An automatic feeder 1007 automatically feeds a recording medium into the apparatus main body. A card slot 1009 receives an adapter for a memory card. A USB terminal 1012 is used for connection to a digital camera. A USB connector used for connection to a personal computer (PC) is disposed on the back surface of the PD printer 1000.

Figure 1B:
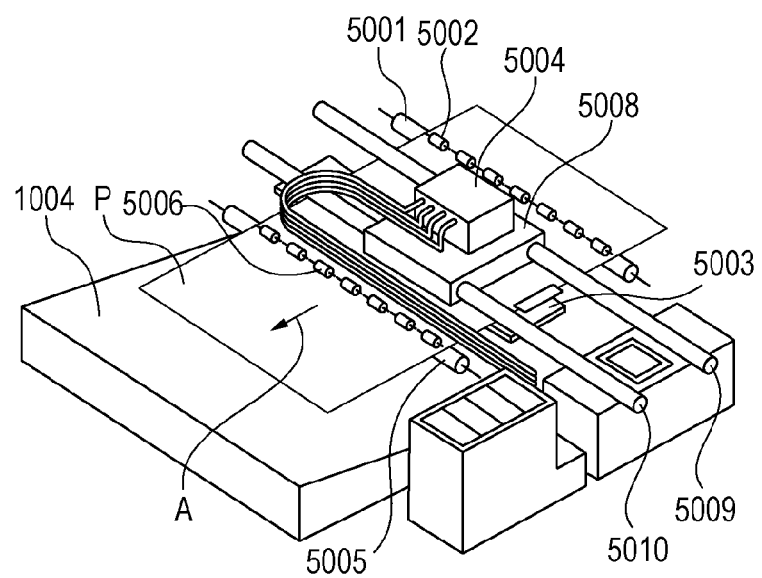

FIG. 1B is a perspective view illustrating the internal configuration of a PD printer. The automatic feeder 1007 feeds a recording medium P into a nip portion between a conveying roller 5001 disposed on a conveyance path and a pinch roller 5002 driven by the conveying roller 5001. The recording medium P is conveyed in a direction indicated by an arrow A (a subscanning direction) in FIG. 1B while being guided onto and supported by a platen 5003 in response to the rotation of the conveying roller 5001. The pinch roller 5002 are elastically biased toward the conveying roller 5001 by a pressing member such as a spring (not illustrated.) The conveying roller 5001 and the pinch roller 5002 are components forming a first conveying unit located upstream in a direction in which the recording medium P is conveyed.

The platen 5003 is placed at a recording position opposite a surface (a discharge surface) on which a discharge port of an inkjet typed recording head 5004 is formed. The platen 5003 supports the undersurface of the recording medium P to keep a distance between the surface of the recording medium P and the discharge surface constant. After being subjected to recording on the platen 5003, the recording medium P is conveyed in the direction A while being held between a rotating discharge roller 5005 and a spur roller 5006 driven by the discharge roller 5005 and is then discharged from the platen 5003 to the discharge tray 1004. The discharge roller 5005 and the spur roller 5006 are components forming a second conveying unit located downstream in the direction in which the recording medium P is conveyed.

The recording head 5004 is detachably mounted on a carriage 5008 with its discharge port surface opposite the platen 5003 and the recording medium P. The carriage 5008 is reciprocated along two guide rails 5009 and 5010 by a driving force of a carriage motor E0001. While the carriage 5008 is reciprocated, the recording head 5004 performs an ink discharging operation in accordance with a recording signal. The direction in which the carriage 5008 is reciprocated is a direction (main scanning direction) orthogonal to the direction represented by the arrow A in which the recording medium P is conveyed. By alternately performing the main scan (movement with recording) of the carriage 5008 and the recording head 5004 and the conveyance (subscan) of the recording medium P, recording is performed on the recording medium P.

Figure 1C:
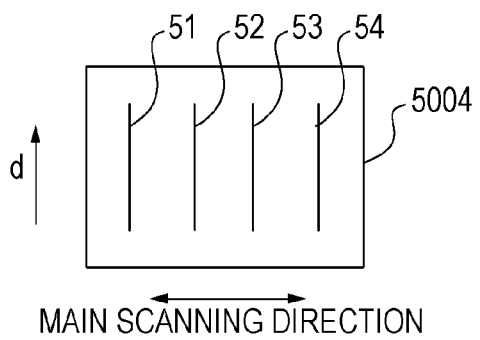

FIG. 1C is a schematic diagram of the recording head 5004 as viewed from the discharge port formation surface. In FIG. 1C, a cyan nozzle array 51, a magenta nozzle array 52, a yellow nozzle array 53, and a black nozzle array 54 are illustrated. The recording of a width d that is a width of each of the nozzle arrays in the subscanning direction can be performed by a single scan.

Each of the nozzle arrays 51 to 54 includes 1200 nozzles arranged in the subscanning direction at intervals of 600 dpi (dot/inch), that is, approximately 42 μm. Each of these nozzles is provided with a discharge port, an ink path for transferring ink to the discharge port, and an electrothermal transducer for generating film boiling in ink near the discharge port. By applying a voltage pulse to each electrothermal transducer in accordance with a discharge signal, film boiling occurs in ink near the electrothermal transducer and ink is discharged from a corresponding discharge port as an ink droplet in accordance with the growing energy of generated bubbles.

Multipass Recording

A recording apparatus according to an embodiment of the present invention can perform multipass recording. Accordingly, in an area in which the recording head 5004 can complete recording by a single recording scan, an image is formed in a stepwise manner by a plurality of recording scans. By conveying a recording medium a distance shorter than the width d of the recording head 5004 between scans, it is possible to reduce color density unevenness and streaks which are caused by the variations among the nozzles. On the basis of information input by a user with the operation panel 1010 and image information received from a host apparatus, it is determined whether multipass recording is performed or the number of passes (the number of recording scans performed on the same area) is determined.

Exemplary multipass recording that can be performed by the above-described recording apparatus will be described with reference to FIG. 2. As exemplary multipass recording, 2-pass recording will be described. However, the present invention is not limited to 2-pass recording. M-pass (M is an integer equal to or greater than 2) recording, for example, 3-pass, 4-pass, 8-pass, or 16-pass recording may be performed. In this specification, an "M-pass (M is an integer equal to or greater than 2) mode" indicates a mode in which recording is performed on the same area of a recording medium by causing a group of recording elements to perform scanning M times while conveying the recording medium a distance shorter than the width of an area where these recording elements are arranged. In this M-pass mode, it is desirable that a conveyance distance of a recording medium conveyed at a time be set to a distance that is 1/M times the width of an area where recording elements are arranged. As a result, the width of the above-described same area of the recording medium in the conveyance direction is the same as a width corresponding to the conveyance distance of the recording medium conveyed at a time.

Figure 2:
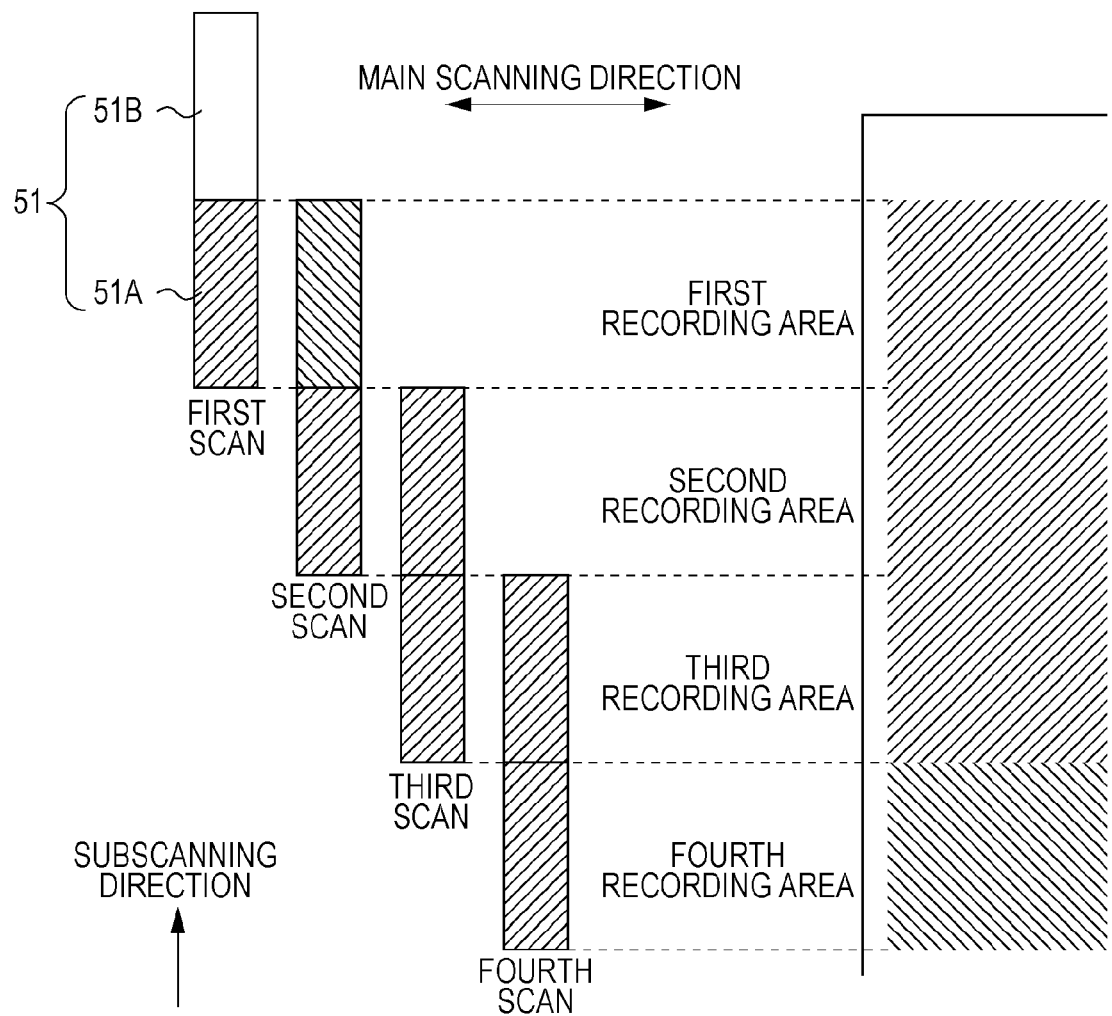
FIG. 2 is a diagram describing 2-pass multipass recording.

FIG. 2 is schematic diagram illustrating 2-pass recording, and illustrates a relative positional relationship between the recording head 5004 and each of first to fourth recording areas. In FIG. 2, only one (a single recording element group) of nozzle arrays included in the recording head 5004 illustrated in FIG. 1C, that is, the cyan nozzle array 51, is illustrated. A group of nozzles (recording elements) on an upstream side in the conveyance direction is hereinafter referred to as an upstream nozzle group 51A, and a group of nozzles (recording elements) on a downstream side in the conveyance direction is hereinafter referred to as a downstream nozzle group 51B. The width of each of the recording areas in the subscanning direction (the conveyance direction) is the same as a width (640-nozzle width) that is approximately half of the width (1280-nozzle width) of an area where a plurality of recording elements included in a recording head are arranged.

In the first scan, only a part of an image to be recorded in the first recording area is recorded with the upstream nozzle group 51A. Image data recorded by the upstream nozzle group 51A has a pixel gradation value that is approximately half of that of original image data (multivalued image data corresponding to a final image to be recorded in the first recording area.) After recording has been performed in the first scan, a recording medium is conveyed in the subscanning direction by a distance equivalent to 640 nozzles.

In the second scan, only a part of an image to be recorded in the second recording area is recorded with the upstream nozzle group 51A and the image to be recorded in the first recording area is completed with the downstream nozzle group 51B. Image data recorded by the downstream nozzle group 51B has a pixel gradation value that is approximately half of that of the original image data (multivalued image data corresponding to the final image to be recorded in the first recording area.) Since image data having a pixel gradation value that is approximately half of that of the original image data is recorded in the first recording area two times, the pixel gradation value of the original image data is achieved. After recording has been performed in the second scan, the recording medium is conveyed in the subscanning direction by the distance equivalent to 640 nozzles.

In the third scan, only a part of an image to be recorded in the third recording area is recorded with the upstream nozzle group 51A and the image to be recorded in the second recording area is completed with the downstream nozzle group 51B. The recording medium is then conveyed in the subscanning direction by the distance equivalent to 640 nozzles. In the fourth scan, only a part of an image to be recorded in the fourth recording area is recorded with the upstream nozzle group 51A and the image to be recorded in the third recording area is completed with the downstream nozzle group 51B. The recording medium is then conveyed in the subscanning direction by the distance equivalent to 640 nozzles. A similar recording operation is performed on other recording areas. By repeatedly performing the above-described main recording scan and the above-described conveyance operation, 2-pass recording is performed on each recording area.

Schematic Electrical Specification of Control Unit

Figure 3:
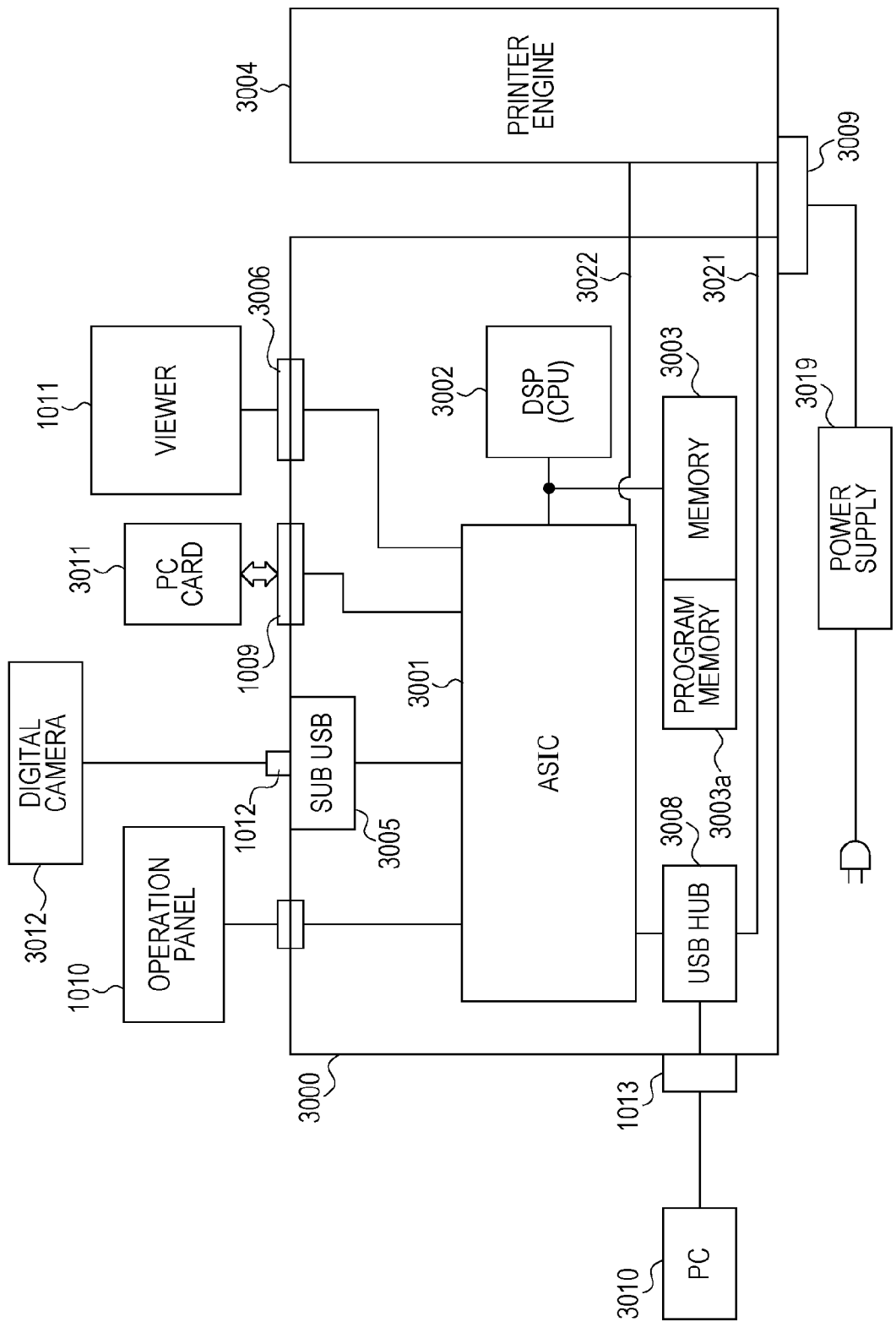
FIG. 3 is a block diagram illustrating a configuration of a main portion for controlling the printer illustrated in FIG. 1.

FIG. 3 is a block diagram illustrating a configuration of a main portion for controlling the PD printer 1000 illustrated in FIG. 1. In FIG. 3, the same reference numerals are used to identify parts already described with reference to FIGS. 1 and 2, and the description thereof will be therefore omitted. As will be apparent from the following description, the PD printer 1000 functions as an image processing apparatus.

Referring to FIG. 3, a control unit (control board) 3000 and an image processing application specific integrated circuit (ASIC) 3001 are illustrated. A digital signal processor (DSP) 3002 includes a CPU and performs various control processing operations to be described later and various image processing operations illustrated in FIG. 5. A memory 3003 includes a program memory 3003a for storing a control program for the CPU, a RAM area for storing a running program, and a memory area functioning as a work memory for storing image data. A printer engine 3004 is an inkjet printer engine for an inkjet printer for printing a color image with a plurality of color inks. A USB connector 3005 functions as a port used for connection to a digital camera (DSC) 3012. A connector 3006 is used for connection to a viewer 1011. When the PD printer 1000 performs printing on the basis of image data transmitted from a personal computer (PC) 3010, a USB HUB 3008 outputs the image data to the printer engine 3004 via a USB 3021. As a result, the PC 3010 can directly transmit/receive data and a signal to/from the printer engine 3004 and perform printing, that is, can function as a general PC printer. A power supply connector 3009 receives from a power supply 3019 a DC voltage into which a commercial AC voltage has been converted. The PC 3010 is a general personal computer. A memory card (PC card) 3011 is illustrated. Exchanging a signal between the control unit 3000 and the printer engine 3004 is performed via the USB 3021 or an IEEE 1284 bus 3022.

First Embodiment

Figure 4:
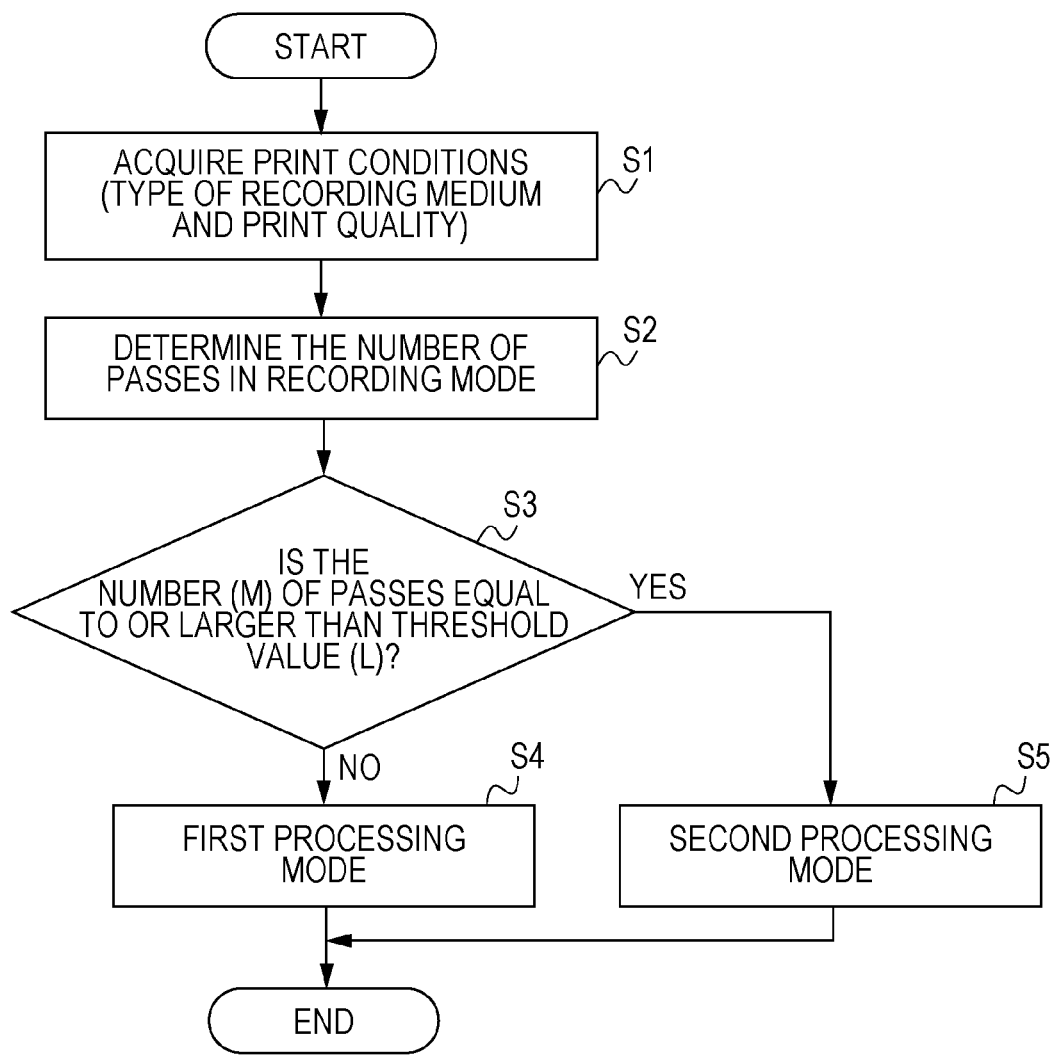
FIG. 4 is a schematic flowchart illustrating a data process according to a first embodiment of the present invention.

FIG. 4 is a schematic flowchart illustrating a data process performed by the PD printer 1000 illustrated in FIG. 1. Upon receiving an image output instruction from a user via the operation panel 1010, the process starts. In step S1, information about print conditions (in this embodiment, the type of a recording medium and print quality) set by a user with the operation panel 1010 is acquired. In step S2, the number (M) of passes in a recording mode is determined on the basis of the information about the type of a recording medium and the information about print quality which have been acquired in step S1. More specifically, the number of passes is determined by referring to a lookup table illustrated in FIG. 13A. For example, when the type of a recording medium is a "normal sheet" and print quality is "high-speed printing", it is determined that a 2-pass mode is set. When the type of a recording medium is the "normal sheet" and print quality is "high quality", it is determined that a 4-pass mode is set.

In step S3, it is determined whether the number (M) of passes determined in step S2 is equal to or larger than a threshold value (L.) It is determined in step S3 that the number (M) of passes determined in step S2 is equal to or larger than the threshold value (L), the process proceeds to step S5. It is determined in step S3 that the number (M) of passes determined in step S2 is smaller than the threshold value (L), the process proceeds to step S4. In this embodiment, the threshold value (L) is set to 4. Accordingly, the process proceeds to step S4 in the case of the 2-pass mode, and the process proceeds to step S5 in the case of the 4-pass mode and an 8-pass mode.

In step S4, a first processing mode is performed. The first processing mode will be described in detail later with reference to FIGS. 5 to 8. To put it in simple, the first processing mode is a mode in which image processing including processing (first dividing processing) for dividing multivalued image data into a plurality of pieces of multivalued data corresponding to passes and processing (first quantization processing) for quantizing each of these pieces of multivalued data is performed. In step S5, a second processing mode is performed. The second processing mode will be described in detail later with reference to FIGS. 9 to 11. To put it in simple, the second processing mode is a mode in which image processing including processing (second quantization processing) for quantizing multivalued image data and generating quantization data and processing (second dividing processing) for dividing the quantization data into pieces of quantization data corresponding to passes using a mask is performed. Thus, an image processing mode (the first processing mode or the second processing mode) is performed on the basis of the number of passes in a recording mode.

The reason why the first processing mode is performed in a recording mode in which a small number of passes are set and the second processing mode is performed in a recording mode in which a large number of passes are set will be described.

As will be apparent from the following description, in the first processing mode, processing is performed so that dots recorded in different passes partially overlap regardless of whether a conveying error of a recording medium occurs. Accordingly, even if dots recorded in different passes do not completely overlap owing to a conveying error, it is possible to reduce the amount of change in a dot coverage ratio. In particular, when the number of recording passes is small, a conveyance distance of a recording medium conveyed at a time between scans becomes large as compared with a case in which the number of recording passes is large. In this case, a conveying error becomes large and a dot coverage ratio is significantly changed. Accordingly, when the number of recording passes is small, it is desirable that the first processing mode capable of reducing the amount of change in the dot coverage ratio be performed. In the first processing mode, however, since multivalued image data is divided into a plurality of pieces of multivalued data corresponding to passes before quantization processing is performed, it is necessary to perform the quantization processing on these pieces of multivalued data. The load of the quantization processing is therefore increased. However, when the number (M) of recording passes is relatively small, the increase in the load of the quantization processing is acceptable. For the above-described reason, the first processing mode is performed in a recording mode in which a small number of recording passes are set.

On the other hand, in the second processing mode, since quantization data acquired after the quantization processing is divided into M pieces of quantization data corresponding to M passes using a mask, the load of the quantization processing in the second processing mode is smaller than that of the quantization processing in the first processing mode. Accordingly, as described previously, when the recording pass number (M) is large, the second processing mode in which the processing load is small is performed because it is not desirable that the first processing mode be performed from the viewpoint of the processing load. There is another reason why the second processing mode is performed when the recording pass number (M) is large. When the recording pass number is large, the conveyance distance of a recording medium conveyed at a time between scans is short and a conveying error is small. Accordingly, a dot coverage ratio is not significantly changed owing to the positional deviation of dots. It is therefore unnecessary to reduce the amount of change in a dot coverage ratio when the recording pass number is large unlike when the recording pass number is small. It is desirable that the number of overlapping dots recorded in different passes be reduced so as to reduce graininess when the recording pass number is large. In the second processing mode, since a mask in which the positions of recordable pixels are complementary is basically used in the second processing mode, the overlapping of dots does not occur in digital data. On a print sheet, a dot overlapping portion is small. Accordingly, in the second processing mode, graininess can be more significantly reduced as compared with the first processing mode. For the above-described reason, the second processing mode is performed when the recording pass number (M) is large.

Thus, in this embodiment, an image processing mode (the first processing mode or the second processing mode) is determined in view of the amount of change in a dot coverage ratio and the load of quantization processing, which are changed in accordance with the recording pass number (M) set in a recording mode, and graininess.

Figure 5:
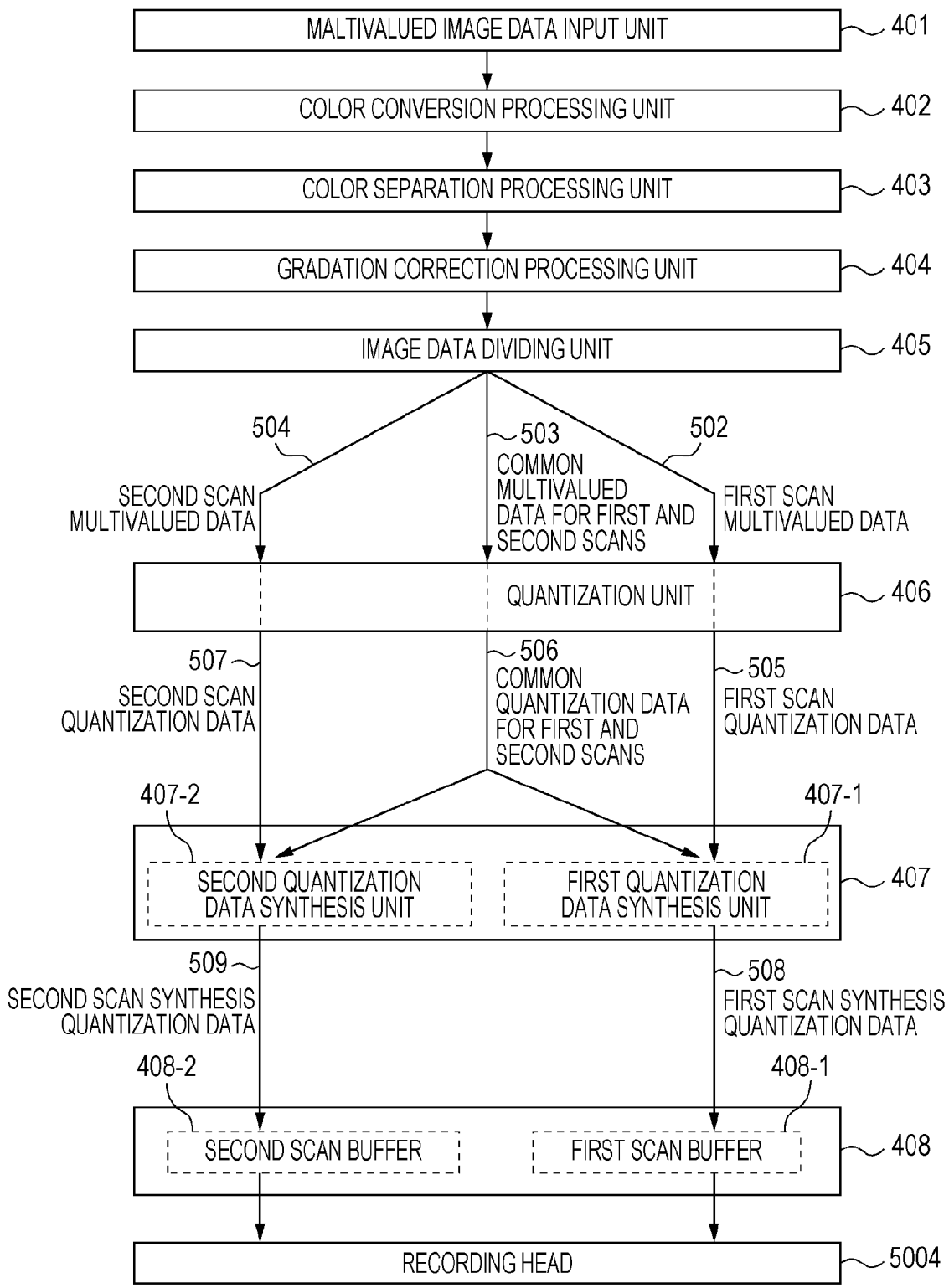
FIG. 5 is a schematic block diagram illustrating a configuration used for a data generation process in a first processing mode.

FIG. 5 is a block diagram illustrating a schematic configuration used for data generation processing in the first processing mode performed in step S4 illustrated in FIG. 4. Here, an exemplary case in which data processing is performed in a 2-pass mode will be described. A multivalued image data input unit 401, a color conversion processing unit 402, a color separation processing unit 403, a gradation correction processing unit 404, an image data dividing unit 405, a quantization unit 406, a quantization data synthesis unit 407, and a print buffer 408, which are illustrated in FIG. 5, are included in the control unit 3000 illustrated in FIG. 3. A process of generating binary data for two passes from RGB input image data will be described with reference to FIG. 5.

The multivalued image data input unit 401 receives RGB image data acquired by an external apparatus such as the digital camera 3012 or the PC 3010. The color conversion processing unit 402 converts the RGB image data into device RGB image data dependent on a printer color reproduction region. The color separation processing unit 403 converts the device RGB image data into multivalued (256-value in this example) image data corresponding to ink colors used in a printer. A printer according to this embodiment uses four color inks, cyan (C), magenta (M), yellow (Y), and black (K) color inks. Accordingly, the device RGB image data (R'G'B') is converted into multivalued data (C1, M1, Y1, and K1) corresponding to C, M, Y, and K inks. The color separation processing unit 403 uses a three-dimensional lookup table (LUT) describing the relationship between each input value (an R'G'B input value) included in the device RGB image data and corresponding output values (C1, M1, Y1, and K1 output values) included in the multivalued image data corresponding to ink colors. At that time, in the case of an input value that does not match the values of table grid points, an output value is calculated by performing interpolation with the output values of adjacent table grid points. A plurality of types of three-dimensional LUTs that can be used by the color separation processing unit 403 are prepared in advance. The color separation processing unit 403 selects one of these three-dimensional LUTs in accordance with the type of a recording medium and the number of passes in a recording mode.

The gradation correction processing unit 404 performs gradation correction processing. Since processing operations performed on C data, M data, Y data, and K data after the gradation correction processing are the same, the processing operation performed on K (black) data will be described below. The gradation correction processing unit 404 receives multivalued data K1 generated by the color separation processing unit 403, and generates multivalued data K2 by performing gradation correction on the multivalued data K1. The multivalued data K2 that has been subjected to gradation correction is input into the image data dividing unit 405.

The image data dividing unit 405 divides the multivalued data K2 into first scan multivalued data 502 for a first scan, second scan multivalued data 504 for a second scan, and common multivalued data 503 for the first and second scans. The first scan multivalued data 502, the common multivalued data 503, and the second scan multivalued data 504 are input into the quantization unit 406.

The quantization unit 406 performs quantization processing (binarization processing in this embodiment) on the first scan multivalued data 502, the common multivalued data 503, and the second scan multivalued data 504. As a result, first scan quantization data 505, common quantization data 506, and second scan quantization data 507 are generated from the first scan multivalued data 502, the common multivalued data 503, and the second scan multivalued data 504, respectively.

In this embodiment, binarization processing based on an exclusive error diffusion method is performed as quantization processing. Although the exclusive error diffusion method will be described in detail later, a brief description thereof is as follows. Error diffusion is performed on the first scan multivalued data, the common multivalued data, and the second scan multivalued data so that recording pixels (pixels at which dots are recorded) determined on the basis of the first scan quantization data (first quantization data according to an embodiment of the present invention), the second scan quantization data (second quantization data according to an embodiment of the present invention), and the common quantization data (third quantization data according to an embodiment of the present invention) corresponding to three planes becomes exclusive. That is, quantization results are controlled so that recording pixel positions determined on the basis of the first scan quantization data 505, the common quantization data 506, and the second scan quantization data 507 do not overlap one another on a recording medium. As a result, it is possible to control the number of recording pixels determined on the basis of the common quantization data for the first and second scans, that is, the number of pixels at which the recording of a dot is performed in both the first and second scans.

The first scan quantization data 505, the common quantization data 506, and the second scan quantization data 507 which have been generated by the quantization unit 406 are input into the quantization data synthesis unit 407. More specifically, the first scan quantization data 505 and the common quantization data 506 are input into a first quantization data synthesis unit 407-1, and the second scan quantization data 507 and the common quantization data 506 are input into a second quantization data synthesis unit 407-2. The first quantization data synthesis unit 407-1 generates first scan synthesis quantization data 508 by performing synthesis (an OR operation in this example) of the first scan quantization data 505 and the common quantization data 506. The second quantization data synthesis unit 407-2 generates second scan synthesis quantization data 509 by performing synthesis (an OR operation in this example) of the second scan quantization data 507 and the common quantization data 506.

The first scan synthesis quantization data 508 and the second scan synthesis quantization data 509 which have been generated by the quantization data synthesis unit 407 are transferred to the print buffer 408. The first scan synthesis quantization data 508 is stored in a first scan buffer 408-1, and the second scan synthesis quantization data 509 is stored in a second scan buffer 408-2.

The first scan synthesis quantization data stored in the first scan print buffer is read out at the time of the first scan, and is then transferred to the recording head 5004. The recording head 5004 performs recording of dots in the first scan on the basis of the first scan synthesis quantization data. The second scan synthesis quantization data stored in the second scan print buffer is read out at the time of the second scan, and is then transferred to the recording head 5004. The recording head 5004 performs recording of dots in the second scan on the basis of the second scan synthesis quantization data. Consequently, an image to be recorded in an area is completed by two scans.

Figure 6:
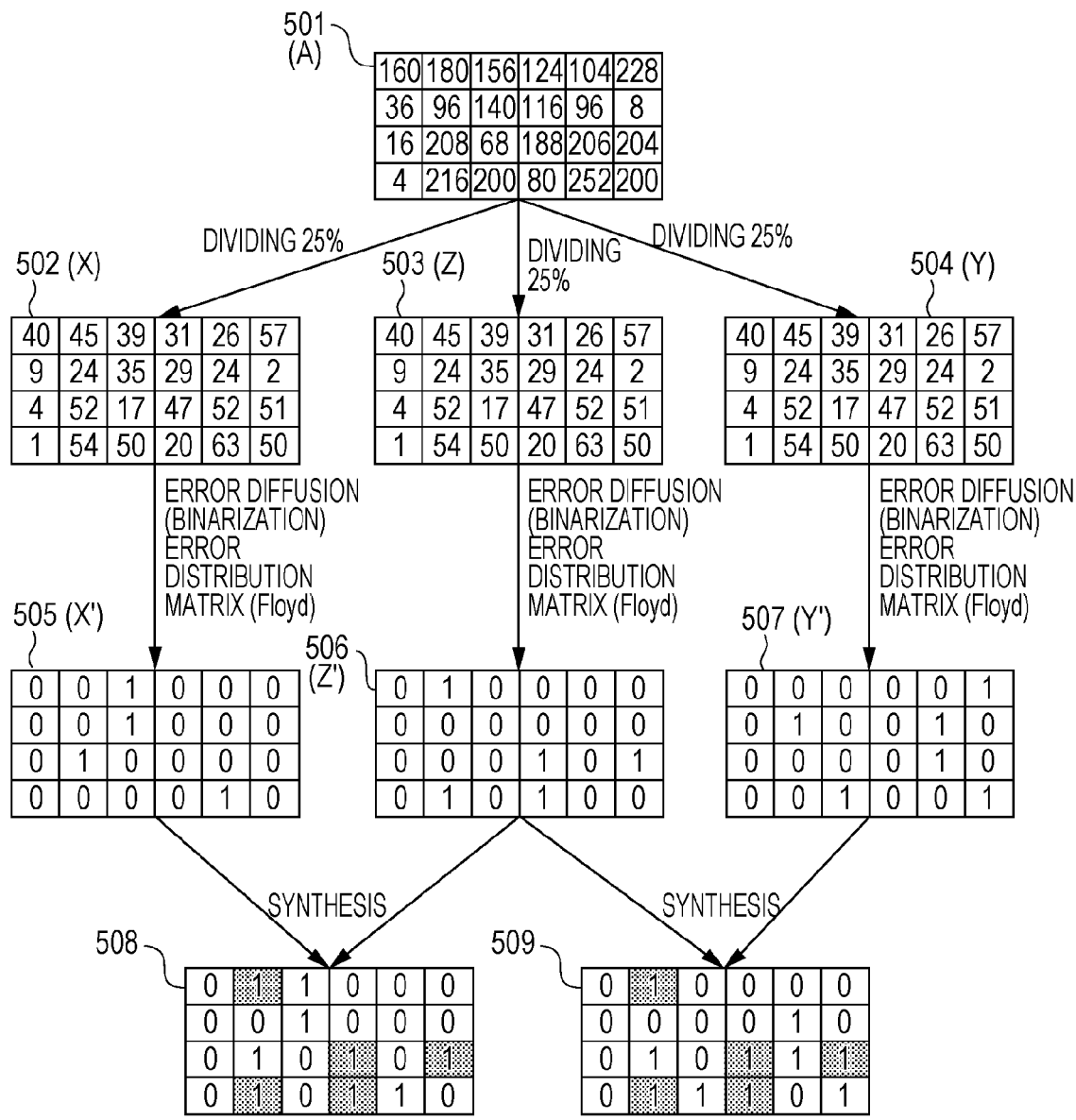
FIG. 6 is a schematic diagram illustrating the process illustrated in FIG. 5 (image data dividing processing → quantization processing → quantization data synthesis processing.)

Next, the image data dividing processing performed in the image data dividing unit 405, the quantization processing performed in the quantization unit 406, and the quantization data synthesis processing performed in the quantization data synthesis unit 407 will be described with reference to FIG. 6. FIG. 6 is a schematic diagram illustrating the image processing illustrated in FIG. 5 (the image data dividing processing → the quantization processing → the quantization data synthesis processing.)

An exemplary case in which multivalued image data 501 corresponding to 24 pixels of 4 pixels (in the subscanning direction)×6 pixels (in the main scanning direction) is processed will be described. The multivalued image data 501 is equivalent to the multivalued data K2 that is input into the image data dividing unit 405 illustrated in FIG. 5 as data that has been subjected to gradation correction.

The image data dividing unit 405 divides the multivalued image data 501 into the first scan multivalued data 502, the second scan multivalued data 504, and the common multivalued data 503 for the first and second scans. It is assumed that the values of the multivalued image data 501, the first scan multivalued data 502, the second scan multivalued data 504, and the common multivalued data 503 are A, X, Y, and Z, respectively. The dividing processing is performed so that X+Y+2Z=A is satisfied and X, Y, and Z are substantially the same. Accordingly, in this embodiment, the dividing processing is performed so that each of X, Y, and Z is approximately quarter (25%) of A that is the value of multivalued image data. More specifically, a quotient α of A divided by 4 and a remainder β (0 to 3) are obtained. Subsequently, X, Y, and Z are determined with the quotient α and the remainder β as follows.

β=0 →X=Y=Z=α
β=1 →X−1 =Y=Z=α
β=2 →X−1 =Y−1 =Z=α
β=3 →X−1 =Y=Z−1=α

The determined X, Y, and Z become the values of the first scan multivalued data 502, the second scan multivalued data 504, and the common multivalued data 503 illustrated in FIG. 6, respectively. For example, when the value A of the multivalued image data is 160, α is 40 and β is 0. Accordingly, the equation of X=Y=Z=α=40 is obtained. The multivalued image data 501 is 256-value data and the value A of the multivalued image data 501 is in the range of 0 to 255.

The quantization unit 406 performs exclusive error diffusion processing on the first scan multivalued data 502, the common multivalued data 503, and the second scan multivalued data 504. A threshold value used in the error diffusion processing is 128. As an error distribution matrix indicating an error distribution coefficient for surrounding pixels used when the error diffusion processing is performed, a Floyd error distribution matrix illustrated in FIG. 7A is used. The first scan quantization data 505 is binary data obtained by quantizing the first scan multivalued data 502. In the first scan quantization data 505, "1" represents a pixel at which a dot is recorded, and "0" represents a pixel at which no dot is recorded. The common quantization data 506 is binary data obtained by quantizing the common multivalued data 503. The second scan quantization data 507 is binary data obtained by quantizing the second scan multivalued data 504. As is apparent from FIG. 6, recording pixel positions determined on the basis of the first scan quantization data 505, the common quantization data 506, and the second scan quantization data 507 which are binary pieces of data do not overlap one another. Thus, in this embodiment, the error diffusion processing is performed on the first scan multivalued data 502, the common multivalued data 503, and the second scan multivalued data 504 corresponding to three planes so that recording pixel positions determined on the basis of the first scan quantization data 505, the common quantization data 506, and the second scan quantization data 507 are mutually exclusive. The exclusive error diffusion processing will be described with reference to FIG. 8.

Figure 8:
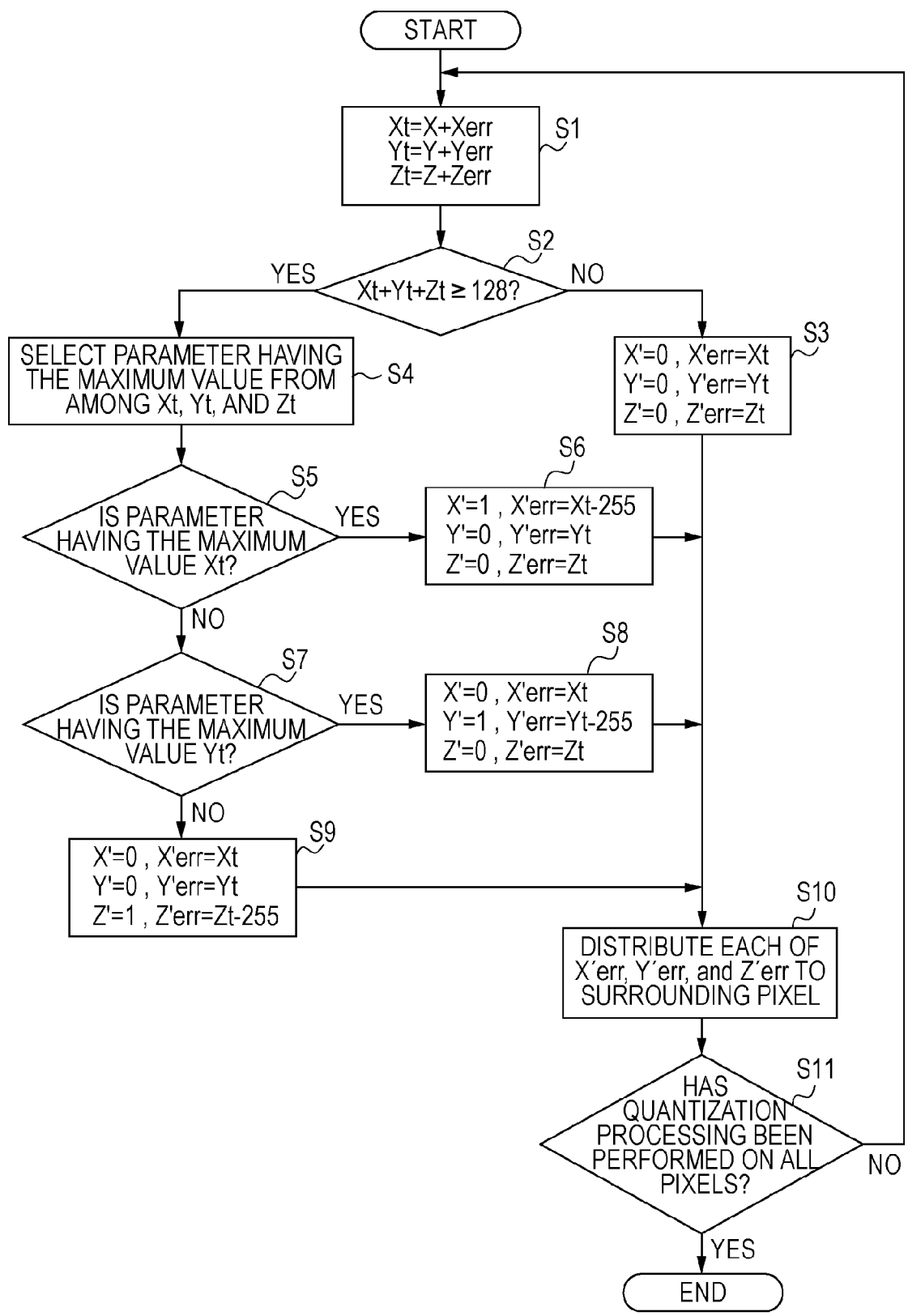
FIG. 8 is a flowchart illustrating binary exclusive error diffusion processing performed as quantization processing in the first processing mode.

FIG. 8 is a flowchart describing exclusive error diffusion processing. In FIG. 8, as described previously, X, Y, and Z individually indicate values of pieces of multivalued data (502, 504, and 503) corresponding to three planes input into the quantization unit 406, and are in the range of 0 to 255. Xerr, Yerr, and Zerr indicate cumulative error values generated from surrounding pixels on which the quantization processing (binarization processing) has already been performed. In this example, in order to store an error generated by quantization processing for each plane, a quantization processing error generated in each plane is distributed to surrounding pixels in the plane. Each of Xt, Yt, and Zt indicates the sum of the value (X, Y, or Z) of the multivalued data and the cumulative error value (Xerr, Yerr, or Zerr.) Each of X', Y', and Z' indicates the value of quantization data (505, 507, or 506) that is a result of quantization processing (binarization processing.) Each of X'err, Y'err, and Z'err indicates an error value generated by quantization processing performed on a target pixel.

In step S1, Xt, Yt, and Zt are calculated for a target pixel. In step S2, Xt, Yt, and Zt are added and it is determined whether a result (Xt+Yt+Zt) of the addition is equal to or larger than a threshold value of 128. It is determined that the result of the addition is smaller than the threshold value, the process proceeds to step S3. In step S3, a result of binarization processing is set to X'=Y'=Z'=0 so that the target pixel is not recorded in any scan, and errors generated by the binarization processing are stored as X'err=Xt, Y'err=Yt, and Z'err=Zt. The process proceeds to step S10.

On the other hand, it is determined in step S2 that the result of the addition is equal to or larger than the threshold value, the process proceeds to step S4. In step S4, in order to determine a plane used to set the target pixel as a recording pixel, a parameter having the maximum value is selected from among Xt, Yt, and Zt. When there are two parameters or more having the maximum value, one parameter is selected from among Xt, Yt, and Zt in the order of Zt, Xt, and Yt. The selection order is not limited to the order of Zt, Xt, and Yt, and Xt or Yt may be preferentially selected.

In step S5, it is determined whether the parameter specified in step S4 is Xt. When it is determined in step S5 that the parameter specified in step S4 is Xt, the process proceeds to step S6. In step S6, a result of the binarization processing is set to X'=1, Y'=0, and Z'=0 so that the target pixel is recorded in only the first scan, and errors generated by the binarization processing are stored as X'err=Xt−255, Y'err=Yt, and Z'err=Zt. The process proceeds to step S10. On the other hand, it is determined in step S5 that the parameter specified in step S4 is not Xt, the process proceeds to step S7. In step S7, it is determined whether the parameter specified in step S4 is Yt. When it is determined in step S7 that the parameter specified in step S4 is Yt, the process proceeds to step S8. In step S8, a result of the binarization processing is set to X'=0, Y'=1, and Z'=0 so that the target pixel is recorded in only the second scan, and errors generated by the binarization processing are stored as X'err=Xt, Y'err=Yt−255, and Z'err=Zt. The process proceeds to step S10. When it is determined in step S7 that the parameter specified in step S4 is not Yt, the process proceeds to step S9. In step S9, a result of the binarization processing is set to X'=0, Y'=0, and Z'=1 so that the target pixel is recorded in both the first and second scans, and errors generated by the binarization processing are stored as X'err=Xt, Y'err=Yt, and Z'err=Zt−255. The process proceeds to step S10.

In step S10, each of X'err, Y'err, and Z'err stored in step S3, S6, S8, or S9 is distributed to surrounding pixels in a corresponding plane in accordance with the error distribution matrix illustrated in FIG. 7A. After the quantization processing has been performed on the target pixel, the process proceeds to step S11. In step S11, it is determined whether the quantization processing has been performed on all pixels. When the quantization processing has not been performed on all pixels, the process returns to step S1. Subsequently, the above-described process is performed on the next target pixel. When the quantization processing has been performed on all pixels, the exclusive error diffusion processing ends. The cumulative error value (for example, Xerr) used in step S1 is a cumulative value of quantization errors (for example, X'err) distributed from one or a plurality of pixels in step S10.

By performing the exclusive error diffusion processing, pieces of quantization data (the first scan quantization data 505 (X'), the common quantization data 506 (Z'), and the second scan quantization data 507 (Y')) corresponding to three planes in which recording pixel positions do not overlap one another are generated as illustrated in FIG. 6.

Referring back to FIG. 6, the first quantization data synthesis unit 407-1 generates the first scan synthesis quantization data 508 by performing synthesis processing (an OR operation in this example) of the first scan quantization data 505 and the common quantization data 506. In the first scan synthesis quantization data 508, a pixel to which "1" is assigned is a recording target pixel in the first scan, and a pixel to which "0" is assigned is not a recording target pixel in the first scan. A pixel indicated by hatched lines is a recording target pixel in both the first and second scans. The second quantization data synthesis unit 407-2 generates the second scan synthesis quantization data 509 by performing synthesis processing (an OR operation in this example) of the second scan quantization data 507 and the common quantization data 506. In the second scan synthesis quantization data 509, a pixel to which "1" is assigned is a recording target pixel in the second scan, and a pixel to which "0" is assigned is not a recording target pixel in the second scan. A pixel indicated by hatched lines is a recording target pixel in both the first and second scans.

Figure 16A:
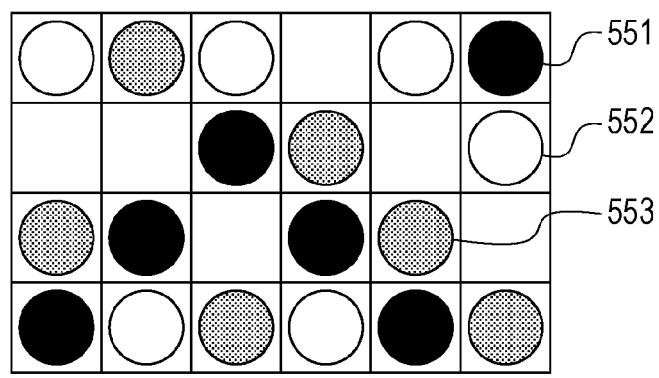
FIGS. 16A and 16B are diagrams each illustrating the arrangement of dots obtained after scanning has been performed two times.
Figure 16B:
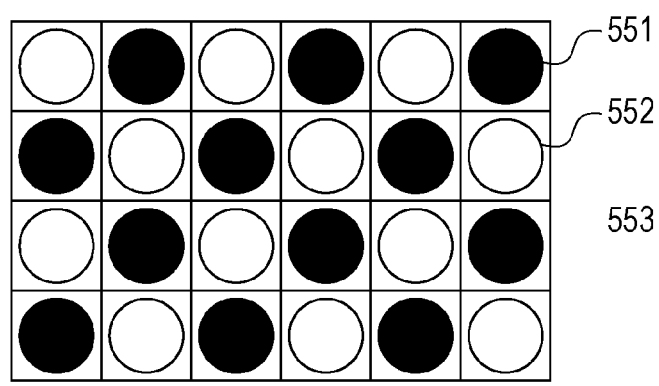

The dividing processing is not necessarily performed so that X+Y+2Z=A is satisfied and X, Y, and Z are substantially the same. When X+Y+2Z=A is satisfied, color density preservation of an image becomes excellent since it is unnecessary to change the value of multivalued data after the dividing processing. Even if X+Y+2Z=A is not satisfied, it is possible to achieve color density preservation of an image on condition that a result of the addition of X+Y+2Z is approximately A. When the above-described processing is performed, a pixel at which no dot is recorded is generated as illustrated in FIG. 16A even if the value of the multivalued image data 501 is the maximum color density value (255.) In the case of arrangement of dots illustrated in FIG. 16A, an image density level is lower than that obtained in the case of arrangement of dots in a 100% solid-printed image illustrated in FIG. 16B. An adequate image density level can be obtained in the case of the arrangement of dots illustrated in FIG. 16A. However, in order to achieve a higher image density level, the values of X, Y, and Z may be set so that a result of the addition of X+Y+2Z is equal to or larger than A.

In the first processing mode, since a pixel at which the recording of a dot is performed in a plurality of scans can be generated, it is possible to suppress the change in a dot coverage ratio (image color density) caused by a conveying error of a recording medium and a movement error of a carriage. Furthermore, since the number of pixels at which the recording of a dot is performed in a plurality of scans (the number of overlapping dots) is controlled by quantizing common multivalued data for these scans, deterioration of graininess, which is caused by a large number of overlapping dots, can be suppressed. As a result, it is possible to reduce graininess while suppressing the change in image color density.

In the first processing mode, since multivalued image data is divided into a plurality of pieces of multivalued data corresponding to passes before quantization processing is performed, it is necessary to perform quantization processing on these pieces of multivalued data. The load of quantization processing is increased. In this embodiment, however, since the first processing mode is employed when the recording pass number (M) is small, the increase in the load of quantization processing is acceptable.

Figure 9:
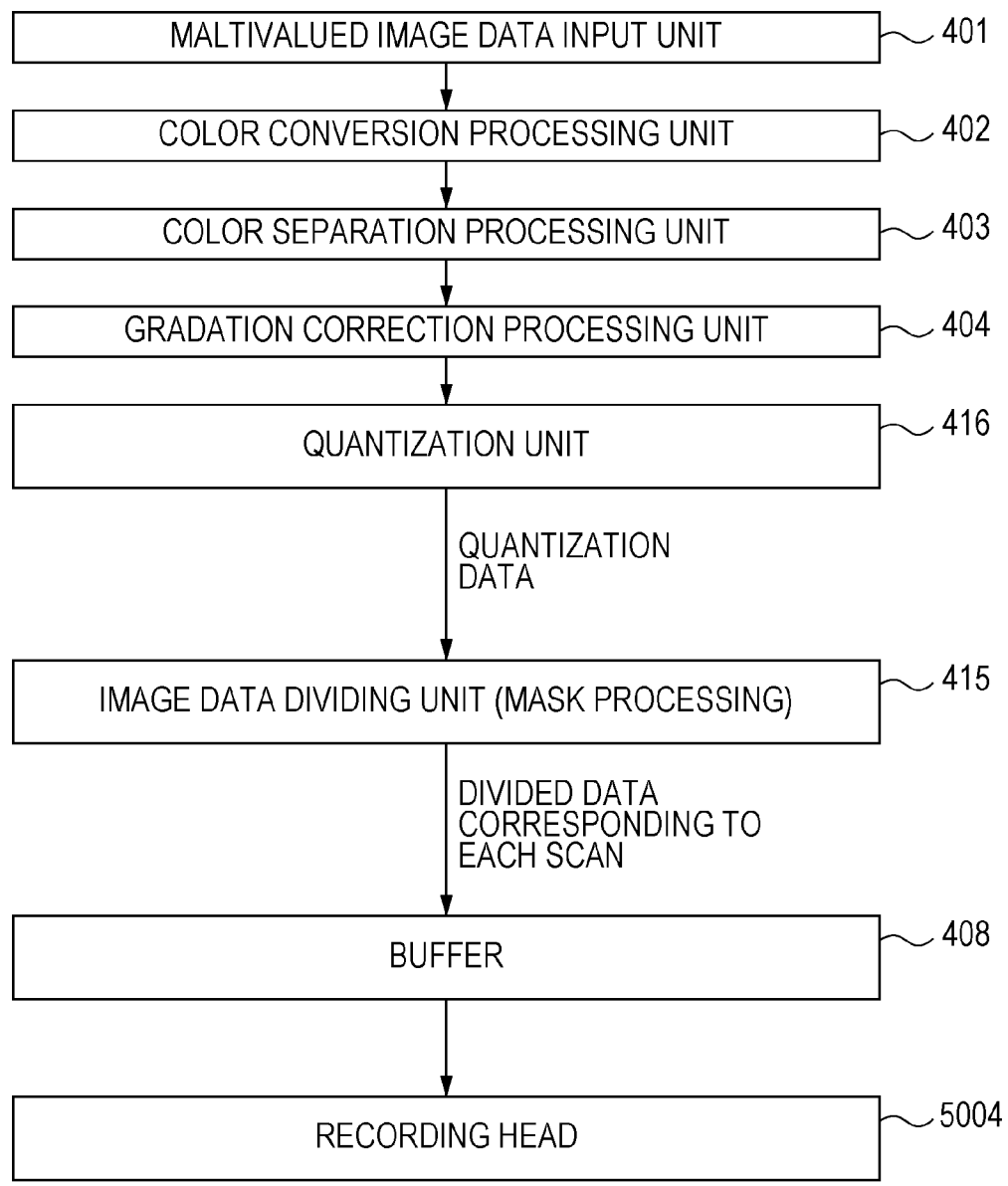
FIG. 9 is a block diagram illustrating a schematic configuration used for a data generation process in a second processing mode.

Next, the second processing mode will be described. FIG. 9 is a block diagram illustrating a schematic configuration used for data generation processing in the second processing mode performed in step S5 illustrated in FIG. 4. An exemplary case in which data processing is performed in a 4-pass mode will be described.

In FIG. 9, the configurations of the multivalued image data input unit 401, the color conversion processing unit 402, the color separation processing unit 403, the gradation correction processing unit 404, and the print buffer 408 are the same as those illustrated in FIG. 5. The configurations of an image data dividing unit 415 and a quantization unit 416 are different from those of the image data dividing unit 405 and the quantization unit 406 illustrated in FIG. 5, respectively. The image data dividing unit 415 and the quantization unit 416 are included in the control unit 3000 illustrated in FIG. 3. A process of generating 4-pass binary data from RGB input image data will be described with reference to FIG. 9.

Processing operations of the multivalued image data input unit 401, the color conversion processing unit 402, the color separation processing unit 403, and the gradation correction processing unit 404 are the same as those described with reference to FIG. 5. Accordingly, the multivalued data K2 that has been subjected to gradation correction is output from the gradation correction processing unit 404 and is then input into the quantization unit 416. Like in the exemplary case described with reference to FIG. 5, in the exemplary case described with reference to FIG. 9, since the same processing is performed on C data, M data, Y data, and K data, the processing performed on the K data will be described and the description of processing performed on the other pieces of color data will be omitted.

The quantization unit 416 performs quantization processing (binarization processing) on input multivalued data with an error diffusion method. A threshold value used in the error diffusion processing is 128. As an error distribution matrix representing an error distribution coefficient for surrounding pixels used in the error diffusion processing, the Floyd error distribution matrix illustrated in FIG. 7A is used. Binary quantization data generated by the quantization unit 416 is input into the image data dividing unit 415.

Figure 10:
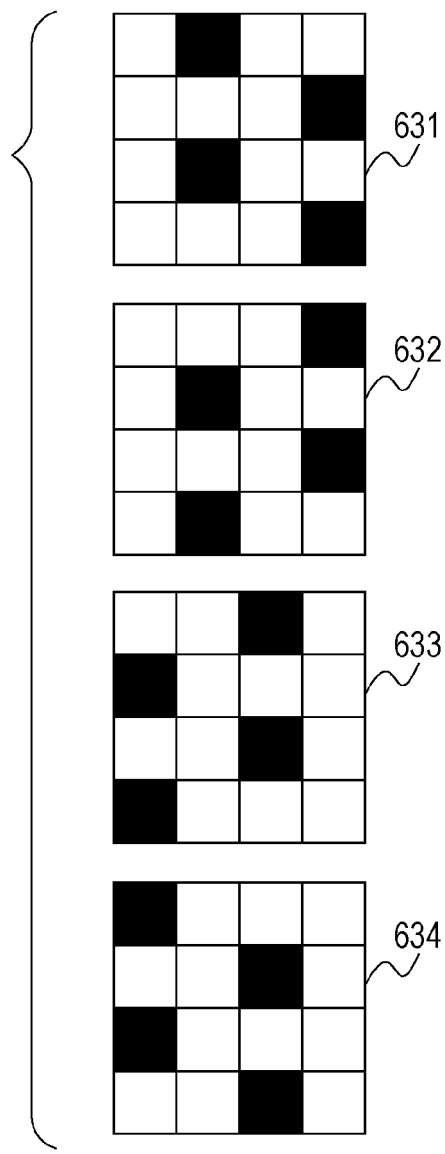
FIG. 10 is a diagram illustrating a 4-pass mask usable in dividing processing in the second processing mode.

The image data dividing unit 415 divides the binary quantization data into pieces of binary divided quantization data corresponding to four scans by thinning out the binary quantization data with pieces of 4-pass mask data illustrated in FIG. 10. FIG. 10 is a schematic diagram illustrating exemplary pieces of mask data usable in 4-pass multipass recording. An area colored black is a recording acceptable pixel (1) and an area colored white is a recording unacceptable pixel (0.) A mask 631 is used in a scan for a first pass, a mask 632 is used in a scan for a second pass, a mask 633 is used in a scan for a third pass, and a mask 634 is used in a scan for a fourth pass. The relationship among recording acceptable pixel positions in the masks 631 to 634 is a complementary relationship. Thus, by performing an AND operation between each of four pieces of mask data and the binary quantization data, the binary quantization data is divided into the pieces of binary divided quantization data that individually correspond to the first, second, third, and fourth scans.

These pieces of binary divided quantization data for four planes corresponding to the first to fourth scans are transferred to the print buffer 408 and are stored in the print buffer 408. The pieces of binary divided quantization data stored in the print buffer 408 are read out at the time of scanning performed by a recording head. On the basis of the read pieces of binary divided quantization data, the recording head is driven to perform recording.

Figure 11:
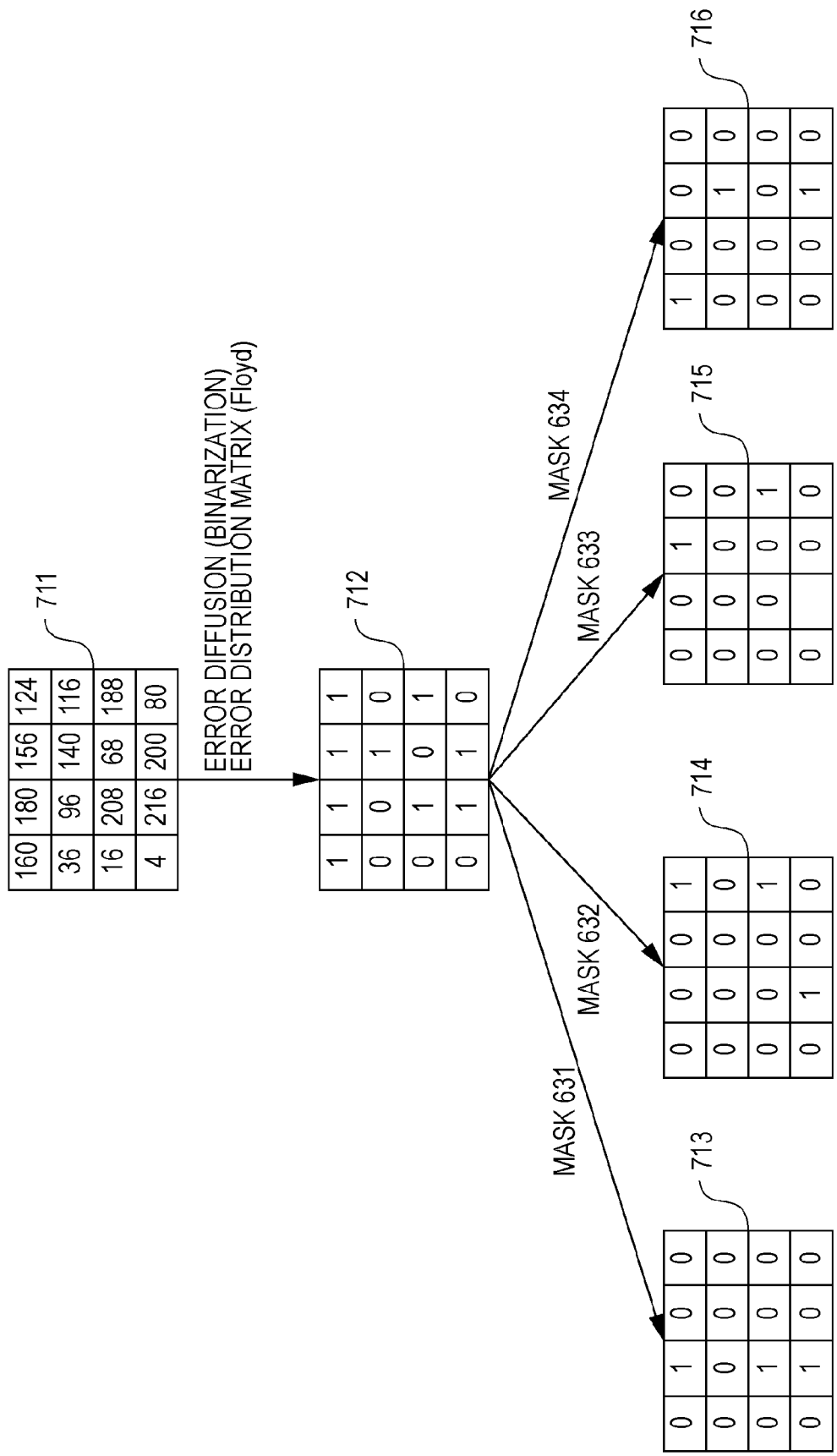
FIG. 11 is a schematic diagram illustrating the process illustrated in FIG. 9 (quantization processing → image data dividing processing.)

Next, the quantization processing performed by the quantization unit 416 and the image data dividing processing performed by the image data dividing unit 415 will be described with reference to FIG. 11. FIG. 11 is a schematic diagram illustrating the image processing (the quantization processing → the image data dividing processing) illustrated in FIG. 9. An exemplary case in which multivalued image data 711 corresponding to 16 pixels of 4 pixels (in the sub-scanning direction)×4 pixels (in the main scanning direction) is processed will be described. The multivalued image data 711 is equivalent to the multivalued data K2 input into the quantization unit 416 illustrated in FIG. 9.

The quantization unit 416 performs binarization processing on the multivalued image data 711 with an error diffusion method using the error distribution matrix illustrated in FIG. 7A and a quantization threshold value (128.) As a result, binary quantization data 712 corresponding to an area of 4 pixels×4 pixels is generated.

The image data dividing unit 415 divides the binary quantization data 712 into binary divided quantization data 713 for the first pass, binary divided quantization data 714 for the second pass, binary divided quantization data 715 for the third pass, and binary divided quantization data 716 for the fourth pass with the masks 631 to 634 illustrated in FIG. 10. More specifically, by performing an AND operation of the binary quantization data 712 and the mask 631, the binary divided quantization data 713 for the first pass is generated. By performing an AND operation of the binary quantization data 712 and the mask 632, the binary divided quantization data 714 for the second pass is generated. By performing an AND operation of the binary quantization data 712 and the mask 633, the binary divided quantization data 715 for the third pass is generated. By performing an AND operation of the binary quantization data 712 and the mask 634, the binary divided quantization data 716 for the fourth pass is generated. As is apparent from the pieces of binary divided quantization data 713 to 716, dots recorded in different scans do not overlap at the same pixel. Accordingly, the increase in graininess caused by the overlapping of dots does not occur. A high-quality image free of graininess can be therefore obtained.

Figure 14:
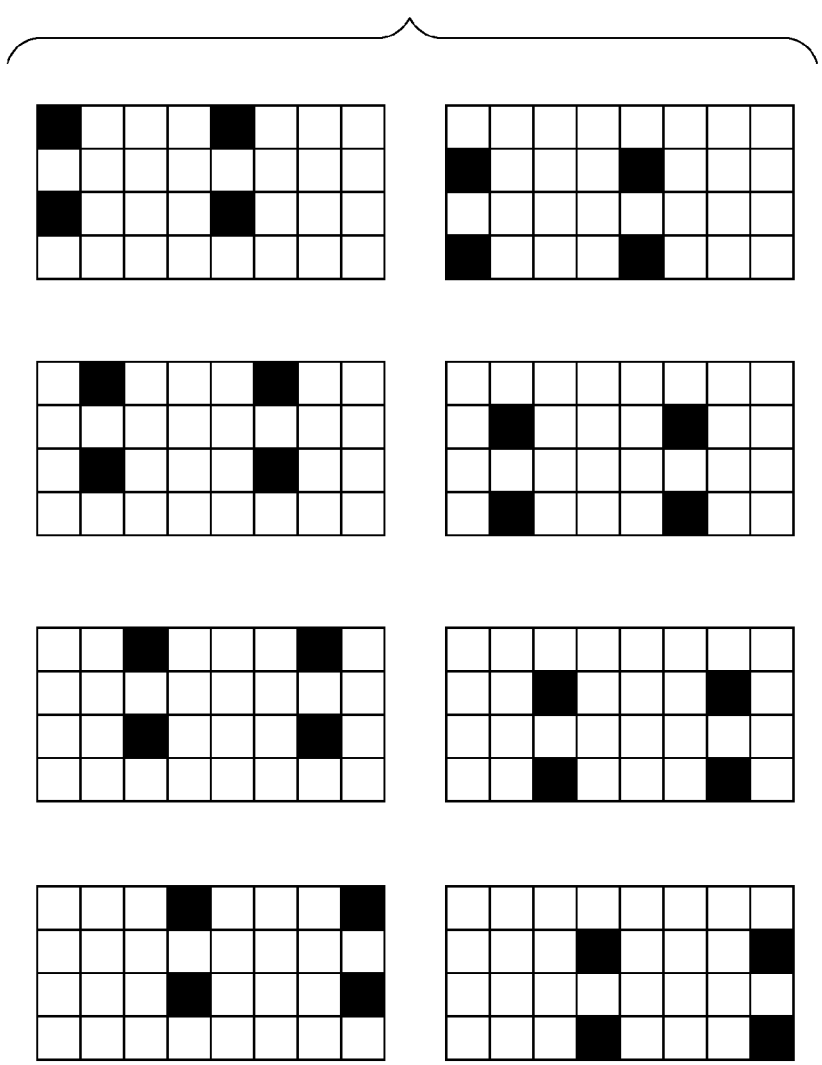
FIG. 14 is a diagram illustrating an 8-pass mask usable in dividing processing performed in the second processing mode.

In step S2 illustrated in FIG. 4, when the type of a recording medium is "glossy sheet" and print quality is "high-quality", it is determined that an 8-pass mode is set as illustrated in FIG. 13A. In the case of the 8-pass mode, the image data dividing unit 415 performs data dividing processing with an 8-pass mask illustrated in FIG. 14. Except for this point, the data dividing processing performed in the 8-pass mode is the same as that performed in the 4-pass mode.

Thus, in the second processing mode, since a pixel at which the recording of a dot is performed in a plurality of scans is not generated, the probability that dots recorded in different scans overlap is low. Accordingly, it is possible to reduce graininess. The low probability that dots recorded in different scans overlap means that a dot coverage ratio is high. Accordingly, a high color density level can be achieved. Furthermore, in the second processing mode, since multivalued image data is divided into M pieces of multivalued data corresponding to M passes after quantization processing has been performed, the load of the quantization processing is relatively low.

According to this embodiment, it is possible to appropriately perform image processing in accordance with the number (M) of passes in a recording mode in consideration of the amount of change in a dot coverage ratio and the load of quantization processing, which are changed with the number (M) of passes in a recording mode, and graininess.

Second Embodiment

In the second embodiment of the present invention, instead of the exclusive error diffusion processing performed in the first embodiment, error diffusion processing using error distribution matrices illustrated in FIGS. 7A to 7C is performed as quantization processing in the first processing mode. The other points (a criterion for determining the number of passes, processing performed in the second processing mode, etc.) are the same as those described in the first embodiment, and the description thereof will be therefore omitted.

The quantization unit 406 illustrated in FIG. 5 receives the first scan multivalued data 502, the common multivalued data 503 for the first and second scans, and the second scan multivalued data 504 generated by the image data dividing unit 405. The quantization unit 406 generates the first scan quantization data 505 by performing binary error diffusion processing on the first scan multivalued data 502. At that time, a threshold value of 128 is used, and the error distribution matrix illustrated in FIG. 7B is used. The quantization unit 406 generates the common quantization data 506 for the first and second scans by performing binary error diffusion processing on the common multivalued data 503 for the first and second scans. At that time, a threshold value of 128 is used, and the error distribution matrix illustrated in FIG. 7A is used. The quantization unit 406 generates the second scan quantization data 507 by performing binary error diffusion processing on the second scan multivalued data 504. At that time, a threshold value of 128 is used, and the error distribution matrix illustrated in FIG. 7C is used.

Thus, by using different error distribution matrices for three planes, it is possible to obtain different quantization results (different recording pixel positions determined on the basis of the first scan quantization data 505, the common quantization data 506, and the second scan quantization data 507) in three planes. As a result, not only a pixel at which recording is performed in the first and second scans (overlapping dots) but also a pixel at which recording is performed in only the first scan and a pixel at which recording is performed in only the second scan can be generated. When the same error distribution matrix is used for the three planes, quantization results in the three planes are similar to one another. In this case, pixels at which recording is performed in the first scan are individually the same as pixels at which recording is performed in the second scan. When an image with the highest color density is recorded, dots are overlap at almost all of recording pixels and no dot is recorded at half of pixels. An image having a large unprinted portion is obtained. In this case, it is difficult to achieve color density preservation of an output image with respect to an input value. In this embodiment, however, since different quantization results are obtained in three planes and not only a pixel at which recording is performed in the first and second scans but also a pixel at which recording is performed in only the first scan and a pixel at which recording is performed in only the second scan are generated as described previously, color density preservation of an output image can be achieved.

The positions of recording pixels (pixels to which "1" is assigned) determined on the basis of the binary pieces of quantization data 505 to 507 generated in this embodiment are not completely mutually exclusive. Recording pixel positions may therefore overlap. For example, when binarization results at a certain pixel in the pieces of quantization data 505 and 506 become "1" and an OR operation is performed in the subsequent synthesis processing like in the first embodiment, the number of recording pixels determined after the synthesis processing has been performed is smaller than that determined on the basis of the pieces of quantization data 505 to 507. As a result, the color density preservation of an output image with respect to an input value is reduced. When the reduction in color density is acceptable, an OR operation can be performed as synthesis processing. On the other hand, when the reduction in color density is unacceptable, synthesis processing may be performed by performing the addition of values ("1" or "0") of quantization data for each pixel and setting a result of the addition as the value of quantization data for the pixel. For example, when the values of the first scan quantization data 505 and the common quantization data 506 are 1 at a certain pixel A, the value of the first scan synthesis quantization data 508 is set to 2 (=1+1.) The number of dots is determined in accordance with a result (0, 1, or 2) of addition and dot recording is performed. This prevents the reduction in color density preservation of an output image with respect to an input value.

According to this embodiment, since the number of pixels (overlapping dots) at which recording is performed in both the first and second scans can be controlled like in the first embodiment, it is possible to suppress the change in image color density and the deterioration of graininess. Furthermore, in this embodiment, since three planes are separately subjected to error diffusion processing, it is possible to increase a processing speed as compared with a case in which exclusive error diffusion processing according to the first embodiment is performed.

In this embodiment, an exemplary case in which different error distribution matrices are used for three planes so as to obtain different quantization results in these planes has been described. For example, however, the same error distribution matrix may be used for planes and different threshold values may be used for these planes. Alternatively, different combinations of an error distribution matrix and a threshold value may be used for planes.

Third Embodiment

In the first and second embodiments, binarization processing is performed as quantization processing. In the third embodiment, ternarization processing is performed as quantization processing. The other points are the same as those described in the first and second embodiments, and the description thereof will be therefore omitted. An exemplary case in which ternarization processing is performed instead of binarization processing according to the first embodiment will be described. However, ternarization processing may be performed instead of binarization processing according to the second embodiment.

First, the second processing mode will be described. The quantization unit 416 illustrated in FIG. 9 uses two threshold values (85 and 170) and the error distribution matrix illustrated in FIG. 7A so as to perform ternarization processing using an error diffusion method. The quantization unit 416 performs ternarization processing, so that ternary quantization data is generated. The ternary quantization data is input into a dot pattern conversion processing unit (not illustrated.) The dot pattern conversion processing unit converts the ternary quantization data into a dot pattern using a method in the related art disclosed in Japanese Patent Laid-Open No. 2001-054956, so that binary data is generated. The generated binary data is input into the image data dividing unit 415 and is then subjected to the same processing as that performed in the first embodiment.

Next, the first processing mode will be described. In the third embodiment, ternary exclusive error diffusion processing is performed on the pieces of multivalued data 502 to 504 so that recoding pixel positions determined on the basis of the pieces of ternary quantization data 505 to 507 do not overlap.

Figure 12:
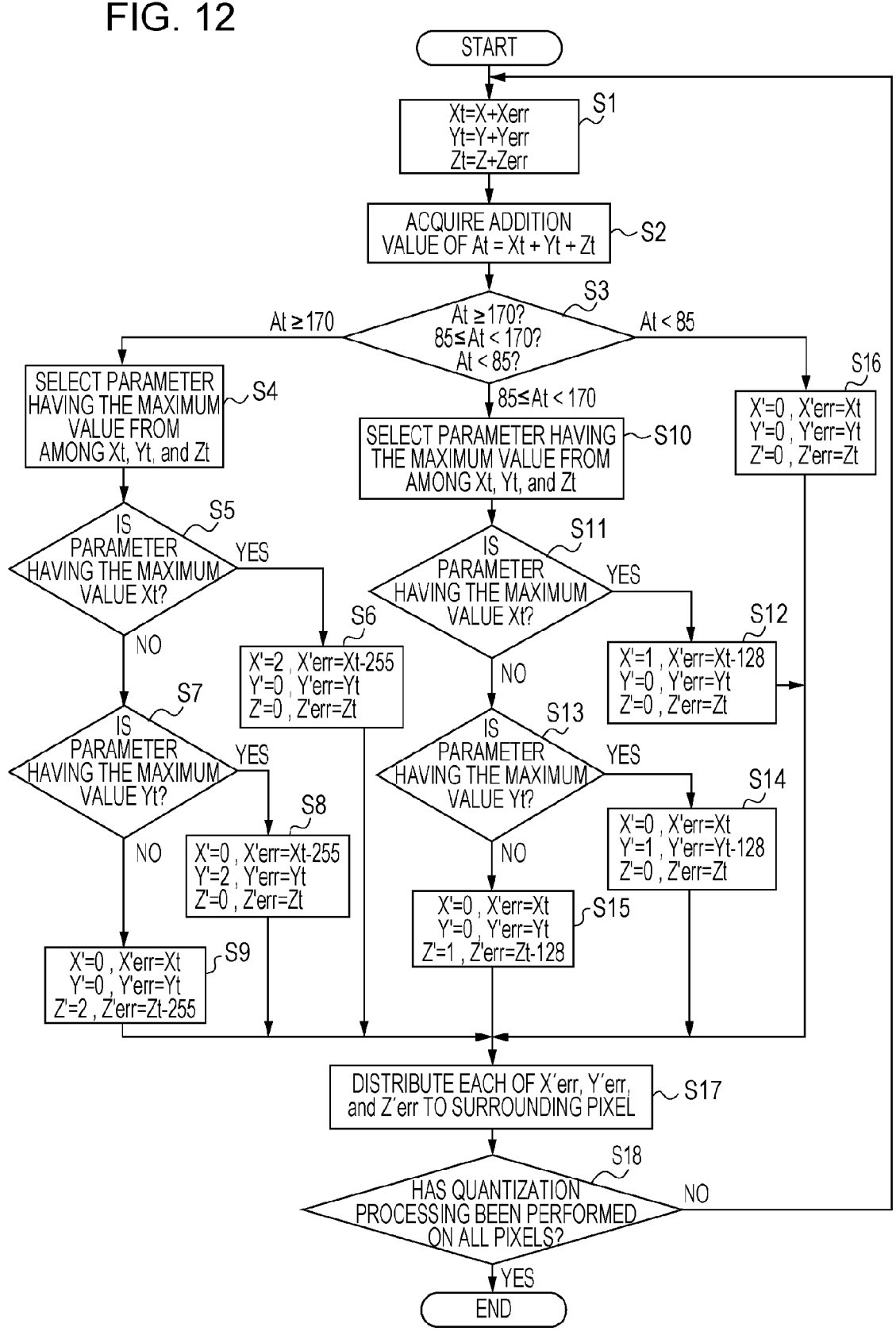
FIG. 12 is a flowchart illustrating a ternary exclusive error diffusion process.

FIG. 12 is a flowchart describing ternary exclusive error diffusion processing. The meanings of symbols (Xt, Xerr, X', etc.) illustrated in FIG. 12 are the same as those in FIG. 8. In this embodiment, a first threshold value (170) and a second threshold value (85) are used. The value of each of X', Y', and Z' that are results of ternarization processing is "0", "1", or "2." "0" indicates that no dot is recorded, "1" indicates that a single dot is recorded, and "2" indicates that two dots are recorded.

In step S1, Xt, Yt, and Zt are calculated for a target pixel. In step S2, an addition value At (=Xt+Yt+Zt) is obtained by adding Xt, Yt, and Zt. In step S3, it is determined whether the addition value At is equal to or larger than the first threshold value (170), is smaller than the first threshold value and is equal to or larger than the second threshold value (85), or is smaller than the second threshold value.

When it is determined in step S3 that the addition value At is smaller than the second threshold value (85), the process proceeds to step S16. In step S16, a ternarization result of X'=Y'=Z'=0 is set so that the target pixel is not recorded in any scan, and errors generated by the ternarization processing are stored as X'err=Xt, Y'err=Yt, and Z'err=Zt. The process proceeds to step S17.

On the other hand, it is determined in step S3 that the addition value At is larger than the first threshold value (170), the process proceeds to step S4. In step S4, in order to determine a plane used to set the target pixel as a recording pixel ("1"), a parameter having the maximum value is selected from among Xt, Yt, and Zt. When there are two parameters or more having the maximum value, one parameter is selected from among Xt, Yt, and Zt in the order of Zt, Xt, and Yt. The selection order is not limited to the order of Zt, Xt, and Yt, and Xt or Yt may be preferentially selected. In step S5, it is determined whether the parameter specified in step S4 is Xt. When it is determined in step S5 that the parameter specified in step S4 is Xt, the process proceeds to step S6. In step S6, a result of the ternarization processing is set to X'=2, Y'=0, and Z'=0 so that two dots are recorded at the target pixel in the first scan, and errors generated by the ternarization processing are stored as X'err=Xt−255, Y'err=Yt, and Z'err=Zt. The process proceeds to step S17. On the other hand, it is determined in step S5 that the parameter specified in step S4 is not Xt, the process proceeds to step S7. In step S7, it is determined whether the parameter specified in step S4 is Yt. When it is determined in step S7 that the parameter specified in step S4 is Yt, the process proceeds to step S8. In step S8, a result of the ternarization processing is set to X'=0, Y'=2, and Z'=0 so that two dots are recorded at the target pixel in the second scan, and errors generated by the ternarization processing are stored as X'err=Xt, Y'err=Yt−255, and Z'err=Zt. The process proceeds to step S17. When it is determined in step S7 that the parameter specified in step S4 is not Yt, the process proceeds to step S9. In step S9, a result of the ternarization processing is set to X'=0, Y'=0, and Z'=2 so that two dots are recorded at the target pixel in both the first and second scans, and errors generated by the ternarization processing are stored as X'err=Xt, Y'err=Yt, and Z'err=Zt−255. The process proceeds to step S17.

On the other hand, it is determined in step S3 that the addition value At is smaller than the first threshold value (170) and is equal to or larger than the second threshold value (85), the process proceeds to step S10. In step S10, in order to determine a plane used to set the target pixel as a recording pixel ("2"), a parameter having the maximum value is selected from among Xt, Yt, and Zt in accordance with a rule similar to the rule used in step S4. In step S11, it is determined whether the parameter specified in step S10 is Xt. When it is determined in step S11 that the parameter specified in step S10 is Xt, the process proceeds to step S12. In step S12, a result of the ternarization processing is set to X'=1, Y'=0, and Z'=0 so that a single dot is recorded at the target pixel in the first scan, and errors generated by the ternarization processing are stored as X'err=Xt−128, Y'err=Yt, and Z'err=Zt. The process proceeds to step S17. On the other hand, it is determined in step S11 that the parameter specified in step S10 is not Xt, the process proceeds to step S13. In step S13, it is determined whether the parameter specified in step S10 is Yt. When it is determined in step S13 that the parameter specified in step S10 is Yt, the process proceeds to step S14. In step S14, a result of the ternarization processing is set to X'=0, Y'=1, and Z'=0 so that a single dot is recorded at the target pixel in the second scan, and errors generated by the ternarization processing are stored as X'err=Xt, Y'err=Yt−128, and Z'err=Zt. The process proceeds to step S17. When it is determined in step S13 that the parameter specified in step S10 is not Yt, the process proceeds to step S15. In step S15, a result of the ternarization processing is set to X'=0, Y'=0, and Z'=1 so that a single dot is recorded at the target pixel in both the first and second scans, and errors generated by the ternarization processing are stored as X'err=Xt, Y'err=Yt, and Z'err=Zt−128. The process proceeds to step S17.

In step S17, each of X'err, Y'err, and Z'err stored in step S6, S8, S9, S12, S14, S15, or S16 is distributed to surrounding pixels in a corresponding plane in accordance with the error distribution matrix illustrated in FIG. 7A. After the quantization processing has been performed on the target pixel, the process proceeds to step S18. In step S18, it is determined whether the quantization processing has been performed on all pixels. When the quantization processing has not been performed on all pixels, the process returns to step S1. Subsequently, the above-described process is performed on the next target pixel. When the quantization processing has been performed on all pixels, the exclusive error diffusion processing ends. By performing the exclusive error diffusion processing, pieces of quantization data (the first scan quantization data 505 (X'), the common quantization data 506 (Z') for the first and second scans, and the second scan quantization data 507 (Y')) corresponding to three planes in which recording pixel positions do not overlap one another are generated.

Thus, in the first processing mode according to this embodiment, effects obtained in the first and second embodiments can be obtained. In addition, an image showing excellent gradation reproducibility can be obtained. When a plurality of dots are formed in a pixel area, ink may be discharged toward the same position in the pixel area a plurality of times or be discharged toward different positions in the pixel area a plurality of times.

Fourth Embodiment

In the first to third embodiments, data processing performed when 2-pass recording is performed as the first processing mode has been described. In the fourth embodiment, data processing performed when 3-pass recording is performed as the first processing mode will be described. In this embodiment, as a table used in determination processing performed in step S2 in FIG. 4, a table illustrated in FIG. 13B is used instead of the table illustrated in FIG. 13A used in the first to third embodiments. The other points are the same as those described in the first embodiment, and the description thereof will be therefore omitted.

In this embodiment, in step S2 illustrated in FIG. 4, the number (M) of passes in a recording mode is determined on the basis of the lookup table illustrated in FIG. 13B, the information about the type of a recording medium acquired in step S1, and the information about print quality acquired in step S1. As is apparent from the table illustrated in FIG. 13B, in this embodiment, the first processing mode is performed when the number of passes is 2 and 3, and the second processing mode is performed when the number of passes is 4 and 8.

Figure 15:
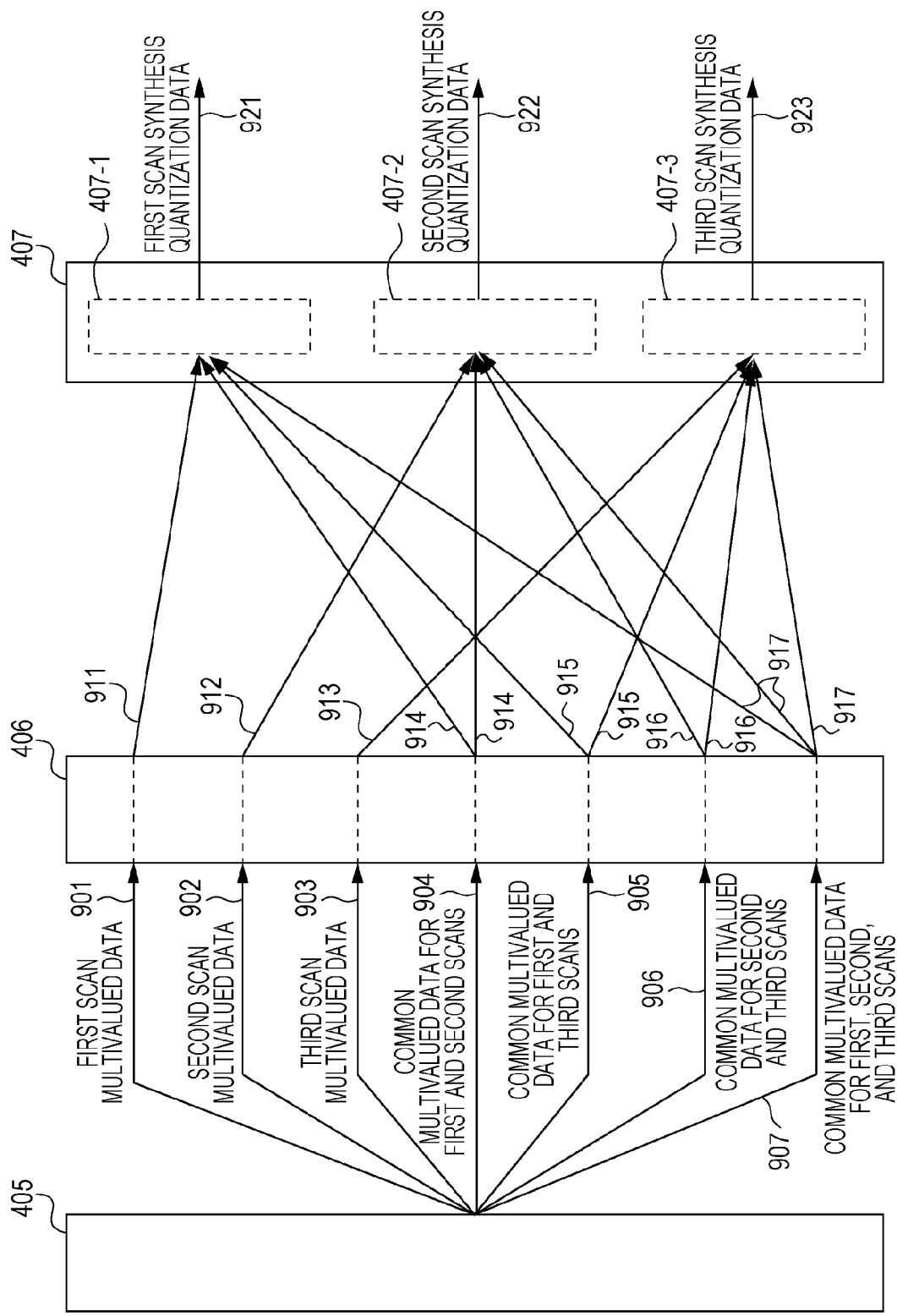
FIG. 15 is block diagram illustrating a schematic configuration used for a 3-pass data generation process in the first processing mode.

FIG. 15 is block diagram illustrating a schematic configuration used for data generation processing performed when a 3-pass mode is executed as the first processing mode. In FIG. 15, only a configuration (the image data dividing unit 405, the quantization unit 406, and the quantization data synthesis unit 407) different from that illustrated in FIG. 5 is illustrated, and the illustration of the same configuration (the multivalued image data input unit 401, the color conversion processing unit 402, the color separation processing unit 403, and the gradation correction processing unit 404) as that illustrated in FIG. 5 is omitted. Like in the first embodiment, the multivalued data K2 (the multivalued image data 501) that has been subjected to gradation correction is input into the image data dividing unit 405.

The image data dividing unit 405 divides the input multivalued image data into first scan multivalued data 901 corresponding to only the first scan, second scan multivalued data 902 corresponding to only the second scan, third scan multivalued data 903 corresponding to only the third scan, common multivalued data 904 corresponding to the first and second scans, common multivalued data 905 corresponding to the first and third scans, common multivalued data 906 corresponding to the second and third scans, and common multivalued data 907 corresponding to all of the first, second, and third scans.

The quantization unit 406 performs the binary exclusive error diffusion described in the first embodiment on the pieces of multivalued data 901 to 907 for seven planes. As a result, first scan quantization data 911, second scan quantization data 912, third scan quantization data 913, common quantization data 914 for the first and second scans, common quantization data 915 for the first and third scans, common quantization data 916 for the second and third scans, and common quantization data 917 for the first, second, and third scans are generated.

The pieces of quantization data 911 to 917 for the seven planes are input into the quantization data synthesis unit 407, and are then subjected to synthesis processing for a corresponding relative scan. More specifically, the first scan quantization data 911, the common quantization data 914, the common quantization data 915, and the common quantization data 917 are input into the first quantization data synthesis unit 407-1. The first quantization data synthesis unit 407-1 performs synthesis processing (an OR operation in this example) on the pieces of quantization data 911, 914, 915, and 917 to generate first scan synthesis quantization data 921. The second scan quantization data 912, the common quantization data 914, the common quantization data 916, and the common quantization data 917 are input into the second quantization data synthesis unit 407-2. The second quantization data synthesis unit 407-2 performs synthesis processing (an OR operation in this example) on the pieces of quantization data 912, 914, 916, and 917 to generate second scan synthesis quantization data 922. The third scan quantization data 913, the common quantization data 915, the common quantization data 916, and the common quantization data 917 are input into a third quantization data synthesis unit 407-3. The third quantization data synthesis unit 407-3 performs synthesis processing (an OR operation in this example) on the pieces of quantization data 913, 915, 916, and 917 to generate third scan synthesis quantization data 923. Consequently, 3-pass recording data can be generated.

In the first processing mode according to this embodiment, the exclusive error diffusion described in the first embodiment is employed as quantization processing. However, for example, the independent error diffusion processing described in the second embodiment may be employed as quantization processing. Quantization processing according to this embodiment is not limited to binarization processing, and may be the ternarization processing described in the third embodiment or N-level (N is equal to or greater than 4) conversion.

In the first processing mode according to this embodiment, dividing processing is performed so that common multivalued data is generated for all combinations of the first, second, and third scans. For example, however, common multivalued data may be generated so that the overlapping of dots occurs only between specific scans (for example, the first and second scans.) In this case, in addition to the first scan multivalued data 901, the second scan multivalued data 902, and the third scan multivalued data 903, only the common multivalued data 904 for the first and the second scans is generated and the common multivalued data 905 for the first and third scans, the common multivalued data 906 for the second and third scans, and the common multivalued data 907 for the first, second, and third scans are not generated.

Other Embodiments

In the first to fourth embodiments, the threshold value (L) used in pass number determination processing is set to 4. When the number of passes in the multipass recording is equal to or larger than 4, the second processing mode is employed. When the number of passes in the multipass recording is smaller than 4 (2 or 3 passes), the first processing mode is employed. However, the threshold value (L) may be set to another value, for example, 8. The second processing mode may be employed when the number of passes is equal to or larger than 8 and the first processing mode may be employed when the number of passes is smaller than 8 (2 to 7 passes.)

In the above-described embodiments, a serial-type recording apparatus for performing multipass recording by causing a recording head to discharge ink during movement (relative scan) of the recording head relative to a recording medium has been described. However, a line-type recording apparatus for performing multipass recording by discharging ink during conveyance (relative scan) of a recording medium relative to a recording head may be applied in the present invention. That is, any apparatus for performing multipass recording during the relative scan of a recording head and a recording medium may be applied in the present invention.

The threshold value (L) used in the pass number determination processing in the above-described embodiments may be changed in accordance with the type of a recording medium. The reason for this is that, even if the same number of passes is set, a conveyance distance of a recording medium may be changed by changing the number of nozzles used in accordance with the type of a recording medium or conveyance accuracy may be changed in accordance with the type (material) of a recording medium. That is, even if the same number of passes is set, a conveyance distance may be changed. In this case, it is desirable that the threshold value (L) used in the pass number determination processing may be changed in accordance with the conveyance distance of a recording medium.

In the above-described embodiments, exemplary cases in which binarization processing and ternarization processing are performed as quantization processing have been described. For example, however, quaternarization processing may be performed. That is, N-value (N is an integer equal to or greater than 2) conversion may be performed as quantization processing in the present invention.

In the above-described embodiments, four color types (C, M, Y, and K) of inks are used. However, light cyan ink (Lc) and light magenta ink (Lm) may be additionally used, or special color inks such as red (R) ink and blue (B) ink may be additionally used. Furthermore, in the above-described embodiments, a color recording mode using a plurality color inks is performed. However, the present invention may be applied to a monochrome mode using monochromatic ink. In addition, the present invention may be applied not only to a color printer but also to a monochrome printer.

In the above-described embodiments, as an image processing apparatus for performing image processing according to an embodiment of the present invention, a recording apparatus (an image forming apparatus) including the control unit 3000 having an image processing function has been described. However, such image processing may be performed by a host apparatus (for example, the PC 3010 illustrated in FIG. 3) into which a printer driver is installed. In this case, the host apparatus connected to a recording apparatus corresponds to an image processing apparatus according to an embodiment of the present invention.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium.)

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-274958 filed Dec. 2, 2009, which is hereby incorporated by reference herein in its entirety.

What is claimed is:

1. An image processing apparatus for processing multivalued image data corresponding to an image to be recorded in a pixel area on a recording medium to record the image in the pixel area on the recording medium by a plurality of relative scans of a recording head and the recording medium, comprising:

a memory;

a processor coupled to the memory, which executes the following:

acquiring information about a number of the plurality of relative scans performed on the pixel area;

selecting a first processing mode when a relative scan number represented by the information acquired is smaller than a threshold value and selecting a second processing mode when the relative scan number is equal to or larger than the threshold value; and performing the first processing mode or the second processing mode selected, and wherein the first processing mode is a mode in which image processing including first dividing processing, first quantization processing, and synthesis processing is performed, the first dividing processing being processing for dividing the multivalued image data into pieces of multivalued data corresponding to the plurality of relative scans and common multivalued data corresponding to at least two of the plurality of relative scans, the first quantization processing being processing for individually quantizing the pieces of multivalued data obtained by the first dividing processing to generate pieces of quantization data corresponding to the plurality of relative scans and quantizing the common multivalued data obtained by the first dividing processing to generate common quantization data corresponding to the two of the plurality of relative scans, the synthesis processing being processing for performing synthesis with the pieces of quantization data and the common quantization data generated by the first quantization processing to generate pieces of synthesis quantization data corresponding to the plurality of relative scans, and wherein the second processing mode is a mode in which image processing including second quantization processing and second dividing processing is performed, the second quantization processing being processing for quantizing the multivalued image data to generate quantization data, the second dividing processing being processing for dividing the quantization data generated by the second quantization processing into pieces of divided quantization data corresponding to the plurality of relative scans.

2. The image processing apparatus according to claim 1, wherein, in the first quantization processing, individually quantizes the pieces of multivalued data and the common multivalued data generated by the first dividing processing with an error diffusion method so that recording pixel positions determined on a basis of the pieces of quantization data and the common quantization data generated by the first quantization processing are exclusive.

3. The image processing apparatus according to claim 1, wherein, in the first quantization processing, individually quantizes the pieces of multivalued data and the common multivalued data generated by the first dividing processing using different error distribution matrices in an error diffusion method.

4. The image processing apparatus according to claim 1, wherein, in the second dividing processing, divides the quantization data generated by the second quantization processing into the pieces of divided quantization data corresponding to the plurality of relative scans using a plurality of pieces of mask data corresponding to the plurality of relative scans.

5. An image processing apparatus for processing multivalued image data corresponding to an image to be recorded in a pixel area on a recording medium to record the image in the pixel area on the recording medium by a plurality of relative scans of a recording head and the recording medium, comprising:
   a memory;
   a processor coupled to the memory, which executes the following:
   acquiring information about a number of the plurality of relative scans performed on the pixel area;
   selecting, when a relative scan number represented by the information acquired is smaller than a threshold value, select a first processing mode in which the multivalued image data is divided into pieces of multivalued data corresponding to the plurality of relative scans and then the pieces of multivalued data are quantized and to, when the relative scan number is equal to or larger than the threshold value, select a second processing mode in which the multivalued image data is quantized for generation of quantization data and then the quantization data is divided into pieces of divided quantization data corresponding to the plurality of relative scans; and
   performing the first processing mode or the second processing mode selected, and wherein the first processing mode includes at least one mode in which image processing including dividing processing, quantization processing, and synthesis processing is performed, the dividing processing being processing for dividing the multivalued image data into multivalued data corresponding to a first relative scan, multivalued data corresponding to a second relative scan, and multivalued data corresponding to the first and second relative scans, the quantization processing being processing for individually quantizing the pieces of multivalued data obtained by the dividing processing to generate first quantization data, second quantization data, and third quantization data, the synthesis processing being processing for synthesizing the first quantization data and the third quantization data to generate synthesis quantization data corresponding to the first relative scan and synthesizing the second quantization data and the third quantization data to generate synthesis quantization data corresponding to the second relative scan.

6. The image processing apparatus according to claim 5, wherein, in the quantization processing, individually quantizes the pieces of multivalued data generated by the dividing processing with an error diffusion method so that recording pixel positions determined on the basis of the first quantization data, the second quantization data, and the third quantization data are exclusive.

7. An image processing method of processing multivalued image data corresponding to an image to be recorded in a pixel area on a recording medium to record the image in the pixel area on the recording medium by a plurality of relative scans of a recording head and the recording medium, comprising:
   acquiring information about a number of the plurality of relative scans performed on the pixel area;
   selecting a first processing mode when a relative scan number represented by the acquired information is smaller than a threshold value and selecting a second processing mode when the relative scan number is equal to or larger than the threshold value; and
   performing the selected first processing mode or the selected second processing mode, and wherein the first processing mode is a mode in which image processing including first dividing processing, first quantization processing, and synthesis processing is performed, the first dividing processing being processing for dividing the multivalued image data into pieces of multivalued data corresponding to the plurality of relative scans and common multivalued data corresponding to at least two of the plurality of relative scans, the first quantization processing being processing for individually quantizing the pieces of multivalued data obtained by the first dividing processing to generate pieces of quantization data corresponding to the plurality of relative scans and quantizing the common multivalued data obtained by the first dividing processing to generate common quantization data corresponding to the two of the plurality of relative scans, the synthesis processing being processing for performing synthesis with the pieces of quantization data and the common quantization data generated by the first quantization processing to generate pieces of synthesis quantization data corresponding to the plurality of relative scans, and wherein the second processing mode is a mode in which image processing including second quantization processing and second dividing processing is performed, the second quantization processing being processing for quantizing the multivalued image data to generate quantization data, the second dividing processing being processing for dividing the quantization data generated by the second quantization processing into pieces of divided quantization data corresponding to the plurality of relative scans.

* * * * *